(12) United States Patent
Tsurumi

(10) Patent No.: US 11,615,628 B2
(45) Date of Patent: Mar. 28, 2023

(54) INFORMATION PROCESSING APPARATUS, INFORMATION PROCESSING METHOD, AND MOBILE OBJECT

(71) Applicant: SONY CORPORATION, Tokyo (JP)

(72) Inventor: Shingo Tsurumi, Saitama (JP)

(73) Assignee: SONY CORPORATION, Tokyo (JP)

( * ) Notice: Subject to any disclaimer, the term of this patent is extended or adjusted under 35 U.S.C. 154(b) by 234 days.

(21) Appl. No.: 16/964,081

(22) PCT Filed: Jan. 11, 2019

(86) PCT No.: PCT/JP2019/000670
§ 371 (c)(1),
(2) Date: Jul. 22, 2020

(87) PCT Pub. No.: WO2019/150918
PCT Pub. Date: Aug. 8, 2019

(65) Prior Publication Data
US 2021/0034884 A1    Feb. 4, 2021

(30) Foreign Application Priority Data
Feb. 2, 2018   (JP) .............................. JP2018-017026

(51) Int. Cl.
*G06V 20/56*     (2022.01)
*G06T 7/70*      (2017.01)
(Continued)

(52) U.S. Cl.
CPC ........... *G06V 20/56* (2022.01); *G06K 9/6262* (2013.01); *G06T 7/70* (2017.01); *G06V 10/40* (2022.01);
(Continued)

(58) Field of Classification Search
CPC ...... G06V 20/56; G06V 20/58; G06V 20/584; G06V 20/625; G06V 2201/08;
(Continued)

(56) References Cited

U.S. PATENT DOCUMENTS 9,805,601 B1 * 10/2017 Fields .............. G08G 1/096844
2003/0076414 A1    4/2003 Sato et al.
(Continued)

FOREIGN PATENT DOCUMENTS

CN        1406790 A     4/2003
DE       60207655 T2    6/2006
(Continued)

OTHER PUBLICATIONS

International Search Report and Written Opinion of PCT Application No. PCT/JP2019/000670, dated Apr. 9, 2019, 10 pages of ISRWO.

*Primary Examiner* — Carol Wang
(74) *Attorney, Agent, or Firm* — Chip Law Group

(57) ABSTRACT

An information processing apparatus according to an embodiment of the present technology includes a first acquisition unit, a second acquisition unit, and a generation unit. The first acquisition unit acquires peripheral information regarding a periphery of a first mobile object. The second acquisition unit acquires, from an apparatus different from the first mobile object, attribute information regarding an attribute of a second mobile object present in the periphery of the first mobile object. The generation unit generates learning data for extracting an attribute of a target mobile object, on the basis of the acquired peripheral information and the acquired attribute information.

18 Claims, 9 Drawing Sheets

(51) Int. Cl.
*G06K 9/62* (2022.01)
*G06V 10/40* (2022.01)

(52) U.S. Cl.
CPC ............... *G06T 2207/20081* (2013.01); *G06T 2207/30252* (2013.01)

(58) Field of Classification Search
CPC .... G06V 10/40; G06K 9/6262; G06K 9/6256; G06T 7/70; G06T 2207/20081; G06T 2207/30252; G06T 2207/10028; G06T 2207/30244; G08G 1/09; G05D 1/02; B60W 30/00
See application file for complete search history.

(56) References Cited

U.S. PATENT DOCUMENTS

| | | | |
|---|---|---|---|
| 2016/0332624 A1* | 11/2016 | Tezuka | B60W 30/16 |
| 2017/0287186 A1* | 10/2017 | Saito | G06T 11/60 |
| 2018/0107901 A1 | 4/2018 | Nakamura et al. | |
| 2018/0218606 A1* | 8/2018 | Michalakis | G05D 1/0234 |
| 2018/0272944 A1* | 9/2018 | Goncalves | B60R 1/00 |
| 2019/0088135 A1* | 3/2019 | Do | G05D 1/0088 |
| 2019/0111945 A1* | 4/2019 | Wiegand | B60W 50/14 |

FOREIGN PATENT DOCUMENTS

| | | |
|---|---|---|
| EP | 1291668 A2 | 3/2003 |
| JP | 2003-189293 A | 7/2003 |
| JP | 2017-027599 A | 2/2017 |
| JP | 2017-102838 A | 6/2017 |
| WO | 2016/157499 A1 | 10/2016 |

\* cited by examiner

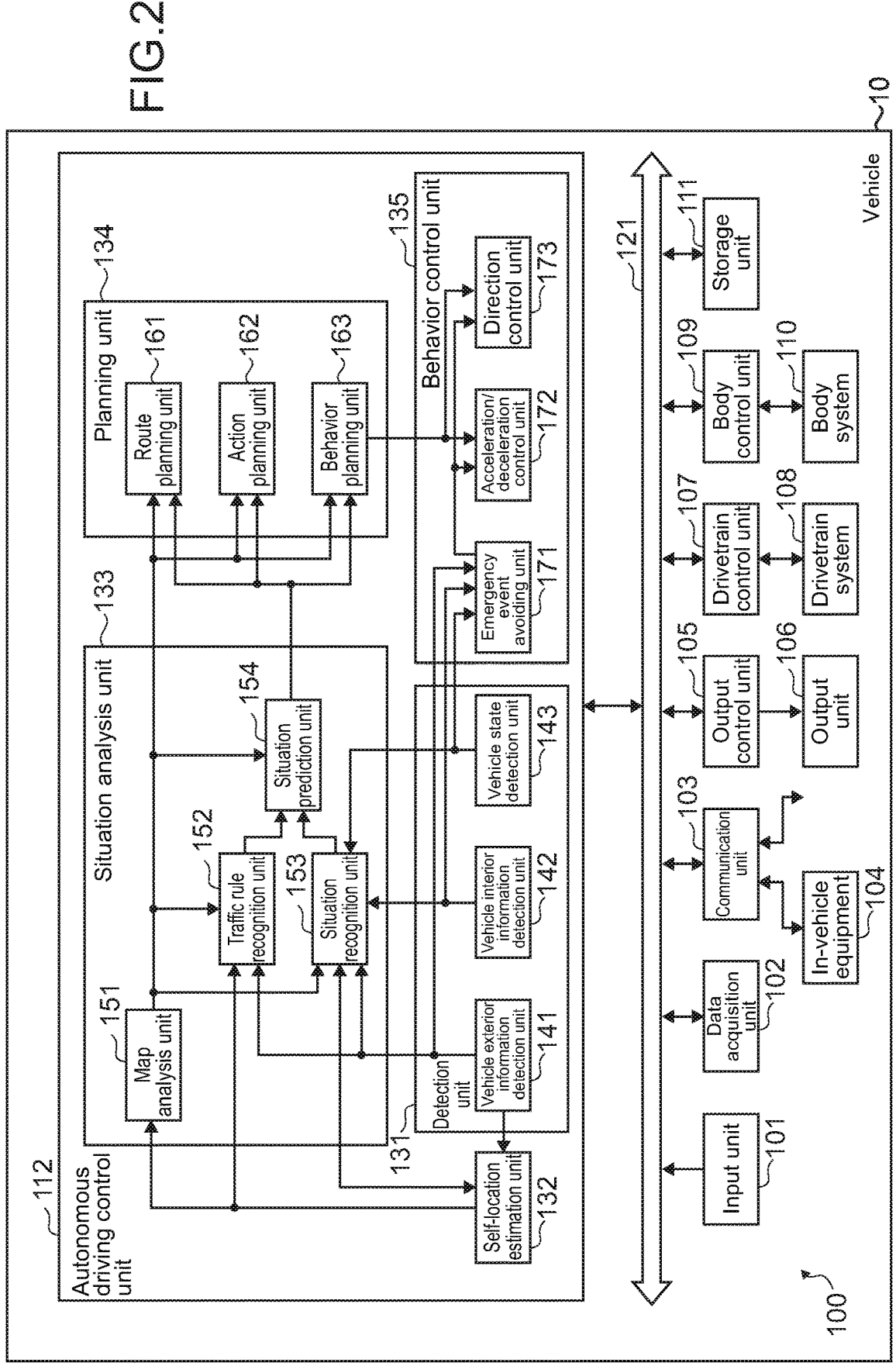

| | Vehicle ID | GPS time | Vehicle type | Model | Number |
|---|---|---|---|---|---|
| (1) | 000001 | 2017-09-27-13-21-15.0000 | Minivan | AA-11 | Number 11-22 |
| (2) | 000002 | 2017-09-27-13-21-19.2489 | SUV | BB-22 | Number 33-44 |

44(45)

| | GPS time | Posture angle φ relative to white line | Position of white line relative to detected vehicle |
|---|---|---|---|
| (1) | 2017-09-27-13-21-15.0000 | 20° | Left |
| (2) | 2017-09-27-13-21-15.0300 | 20° | Left |
| (3) | 2017-09-27-13-21-15.0600 | 21° | Left |
| | | | |
| | | | |

INFORMATION PROCESSING APPARATUS, INFORMATION PROCESSING METHOD, AND MOBILE OBJECT

CROSS REFERENCE TO RELATED APPLICATIONS

This application is a U.S. National Phase of International Patent Application No. PCT/JP2019/000670 filed on Jan. 11, 2019, which claims priority benefit of Japanese Patent Application No. JP 2018-017026 filed in the Japan Patent Office on Feb. 2, 2018. Each of the above-referenced applications is hereby incorporated herein by reference in its entirety.

TECHNICAL FIELD

The present technology relates to an information processing apparatus, an information processing method, a program, and a mobile object, which are for generating learning data.

BACKGROUND ART

The technology of controlling mobile objects such as automobiles by using machine learning has been developed in the past. For example, training an apparatus or a system having a function of machine learning by using predetermined learning data allows detection of other vehicles and prediction of the course of other vehicles, for example.

For example, Patent Literature 1 describes a prediction system for predicting a turning motion or the like of another vehicle. In the prediction system, a modeling unit based on artificial intelligence (AI) is constructed. The modeling unit is trained (subjected to learning) using, for example, general-purpose training data. The trained modeling unit generates a model of the behaviors, routes, or the like of other vehicles and predicts the turning radius or the like of other vehicles. The own vehicle is controlled on the basis of such prediction results, and autonomous driving is achieved (paragraphs [0044], [0047], [0057], and [0084] of the specification, FIG. 2, FIG. 6, and the like of Patent Literature 1).

CITATION LIST

Patent Literature

Patent Literature 1: Japanese Patent Application Laid-open No. 2017-27599

DISCLOSURE OF INVENTION

Technical Problem

The technology of controlling mobile objects such as automobiles by using machine learning is considered to be popularized in the future, and the technology that can improve the accuracy of machine learning used for control of a mobile object or the like is expected.

In view of the circumstances as described above, it is an object of the present technology to provide an information processing apparatus, an information processing method, a program, and a mobile object, which can improve the accuracy of machine learning that can be used for control of a mobile object or the like.

Solution to Problem

In order to achieve the object described above, an information processing apparatus according to an embodiment of the present technology includes a first acquisition unit, a second acquisition unit, and a generation unit.

The first acquisition unit acquires peripheral information regarding a periphery of a first mobile object.

The second acquisition unit acquires, from an apparatus different from the first mobile object, attribute information regarding an attribute of a second mobile object present in the periphery of the first mobile object.

The generation unit generates learning data for extracting an attribute of a target mobile object, on the basis of the acquired peripheral information and the acquired attribute information.

In such an information processing apparatus, the peripheral information of the first mobile object is acquired, and the attribute information of the second mobile object in the periphery of the first mobile object is acquired from an apparatus different from the first mobile object. On the basis of the acquired peripheral information and attribute information, learning data for extracting an attribute of a target mobile object is generated. In such a way, learning data can be easily generated by acquiring the attribute information of the second mobile object from another apparatus, and the accuracy of machine learning that can be used for control of the mobile object or the like can be improved.

The learning data may be data in which the peripheral information and label information are associated with each other. In this case, the generation unit may generate the label information associated with the peripheral information on the basis of the attribute information of the second mobile object.

This makes it possible to easily generate the learning data, and for example, to mass-produce the learning data. As a result, it is possible to sufficiently improve the accuracy of machine learning that can be used for control of a mobile object or the like.

The attribute information may include at least one of a posture, a location, a vehicle type, or a model of the second mobile object.

This makes it possible to generate learning data for extracting various attributes of the mobile object, and to improve the accuracy of machine learning that can be used for control of the mobile object or the like.

The apparatus different from the first mobile object may be the second mobile object.

This makes it possible to easily acquire accurate attribute information about the second mobile object, and to easily generate highly accurate learning data.

The first mobile object may include a sensor unit that detects at least one of image information or depth information of the periphery of the first mobile object, as the peripheral information.

This makes it possible to use the image information or the depth information of the periphery of the first mobile object as the learning data, and to generate various types of learning data.

The information processing apparatus may further include a detection unit that detects the second mobile object present in the periphery of the first mobile object. In this case, the second acquisition unit may be capable of acquiring the attribute information of the detected second mobile object.

In such a manner, by detecting the second mobile object and performing the processing, attribute information can be properly acquired, and highly reliable learning data can be generated.

The information processing apparatus may further include a calculation unit that calculates first posture information regarding a posture of the first mobile object. In this case, the attribute information may include second posture information regarding a posture of the second mobile object. Further, the generation unit may generate the label information on the basis of the first posture information and the second posture information.

Thus, for example, the label information about the posture of the mobile object can be generated with high accuracy, and the accuracy of machine learning that can be used for control of the mobile object or the like can be sufficiently improved.

The calculation unit may calculate the first posture information on the basis of the peripheral information.

Thus, for example, it is possible to properly calculate the posture or the like of the first mobile object when the peripheral information is detected.

The generation unit may calculate, as the label information, a relative posture of the second mobile object relative to the first mobile object on the basis of the first posture information and the second posture information.

This makes it possible to easily generate learning data for extracting, for example, a relative traveling angle, a traveling direction, and the like of the mobile object.

The peripheral information may include information of a reference object that is a reference for calculating the relative posture. In this case, the first posture information may be information of a posture of the first mobile object relative to the reference object. Further, the second posture information may be information of a posture of the second mobile object relative to the reference object.

In such a manner, by using the posture of the first mobile object and the posture of the second mobile object relative to the common reference object, it is possible to easily calculate an arrangement relation between the mobile objects and the like.

The first posture information may be information of a posture of the first mobile object relative to a reference direction with the reference object being as a reference. In this case, the second posture information may be information of a posture of the second mobile object relative to the reference direction.

In such a manner, by using the common reference direction, it is possible to calculate the arrangement relationship between the first mobile object and the second mobile object or the like with high accuracy, and to improve the accuracy of the learning data.

The first acquisition unit may acquire, if a distance between a detection position at which the peripheral information is detected and the reference object is larger than a predetermined threshold value, reference peripheral information detected at a proximity position closer to the reference object than the detection position. In this case, the generation unit may calculate the relative posture at the detection position on the basis of the reference peripheral information.

Thus, for example, even if the first mobile object and the reference object are distant from each other, it is possible to accurately calculate the relative postures of the first and second mobile objects.

The calculation unit may calculate reference posture information regarding a posture of the first mobile object relative to the reference object at the proximity position on the basis of the reference peripheral information, and calculate a posture change of the first mobile object during movement from the detection position to the proximity position.

This makes it possible to properly calculate the posture of the first mobile object in a state close to the reference object and the posture change until approaching the reference object.

The calculation unit may calculate the first posture information regarding a posture of the first mobile object relative to the reference object at the detection position on the basis of the reference posture information and the posture change.

This makes it possible to properly calculate the posture of the first mobile object relative to the reference object, for example, even if the first mobile object and the reference object are distant from each other.

The second acquisition unit may acquire information regarding a timing at which the attribute information is generated.

This makes it possible to easily calculate the posture or the like of the second mobile object, for example, at the timing when the peripheral information is detected, and to easily generate highly accurate learning data.

The information processing apparatus may further include a timing control unit that controls a timing at which the peripheral information is detected, in accordance with a timing at which the attribute information is generated.

This makes it possible to generate accurate label information and generate highly accurate learning data. As a result, the accuracy of the machine learning can be sufficiently improved.

The apparatus different from the first mobile object may be capable of continuously generating the attribute information. In this case, the timing control unit may control a sensor unit that detects the peripheral information such that the peripheral information is continuously detected during a period of time in which the attribute information is continuously generated.

This makes it possible to easily acquire the attribute information generated, for example, at the same timing as the detection of the peripheral information and to easily mass-produce highly accurate learning data.

An information processing method according to an embodiment of the present technology is an information processing method to be executed by a computer system, the information processing method including: acquiring peripheral information regarding a periphery of a first mobile object; acquiring, from an apparatus different from the first mobile object, attribute information regarding an attribute of a second mobile object present in the periphery of the first mobile object; and generating learning data for extracting an attribute of a target mobile object, on the basis of the acquired peripheral information and the acquired attribute information.

A program according to an embodiment of the present technology is a program that causes a computer system to execute the steps of: acquiring peripheral information regarding a periphery of a first mobile object; acquiring, from an apparatus different from the first mobile object, attribute information regarding an attribute of a second mobile object present in the periphery of the first mobile object; and generating learning data for extracting an attribute of a target mobile object, on the basis of the acquired peripheral information and the acquired attribute information.

A mobile object according to an embodiment of the present technology includes a first acquisition unit, a second acquisition unit, and a generation unit.

The first acquisition unit acquires peripheral information regarding a periphery.

The second acquisition unit acquires, from a different apparatus, attribute information regarding an attribute of a peripheral mobile object present in the periphery.

The generation unit generates learning data for extracting an attribute of a target mobile object, on the basis of the acquired peripheral information and the acquired attribute information.

Advantageous Effects of Invention

As described above, according to the present technology, it is possible to improve the accuracy of machine learning that can be used for control of a mobile object or the like. Note that the effects described herein are not necessarily limited and any one of the effects described in this disclosure may be produced.

BRIEF DESCRIPTION OF DRAWINGS

FIG. 2 is a block diagram illustrating a configuration example of a vehicle control system that controls a vehicle.

MODE(S) FOR CARRYING OUT THE INVENTION

Hereinafter, an embodiment of the present technology will be described with reference to the drawings.

[Configuration of Vehicle Control System]

Figure 1A:
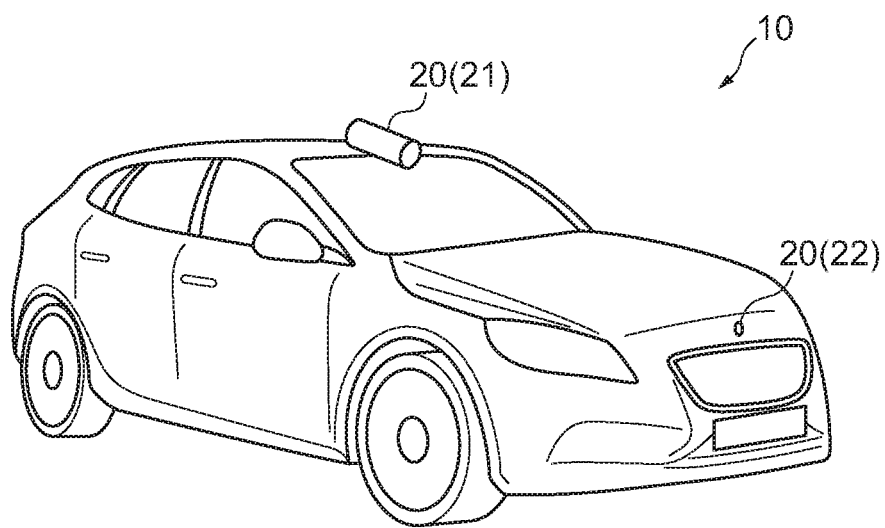
FIGS. 1A and 1B are external views each illustrating a configuration example of a vehicle including an autonomous driving control unit according to an embodiment of the present technology.
Figure 1B:
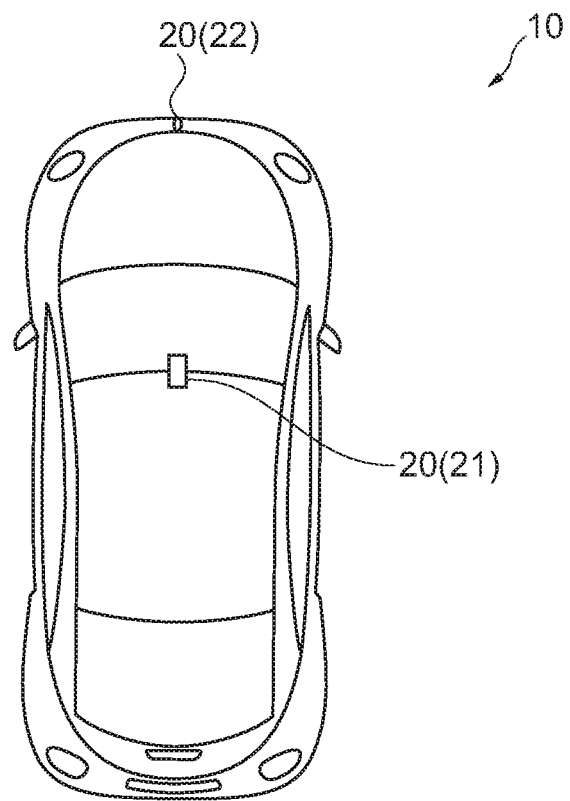

FIGS. 1A and 1B are external views each illustrating a configuration example of a vehicle including an autonomous driving control unit according to an embodiment of the present technology. FIG. 1A is a perspective view illustrating a configuration example of a vehicle 10. FIG. 1B is a schematic diagram obtained when the vehicle 10 is viewed from above. The vehicle 10 has an autonomous driving function capable of automatically driving to a destination. The vehicle 10 is an example of a mobile object in this embodiment.

As illustrated in FIGS. 1A and 1B, the vehicle 10 includes a peripheral sensor 20. The peripheral sensor 20 detects peripheral information related to the periphery of the vehicle 10. Here, the peripheral information is information including image information, depth information, or the like of the periphery of the vehicle 10. FIGS. 1A and 1B schematically illustrate, as an example of the peripheral sensor 20, an imaging device 21 and a distance sensor 22.

The imaging device 21 is disposed facing a forward direction of the vehicle 10, images the front side of the vehicle 10, and detects image information. Examples of the imaging device 21 to be used include an RGB camera including an image sensor such as a charge-coupled device (CCD) or a complementary metal-oxide semiconductor (CMOS). The present technology is not limited thereto, and an image sensor or the like that detects infrared light or polarized light may be used as the imaging device 21.

The distance sensor 22 is disposed facing a forward direction of the vehicle 10. The distance sensor 22 detects information regarding a distance between the distance sensor 22 and an object included in a detection range of the distance sensor 22, and detects depth information in the periphery of the vehicle 10. Examples of the distance sensor 22 to be used include a LiDAR (Laser Imaging Detection and Ranging) sensor. Use of the LiDAR sensor allows an image with depth information (depth image) or the like to be easily detected, for example. Alternatively, for example, a TOF (Time of Fright) depth sensor or the like may be used as the distance sensor 22. In addition, the type or the like of the distance sensor 22 is not limited, and any sensor using a range finder, a millimeter-wave radar, an infrared laser, or the like may be used.

In addition, the type, number, and the like of the peripheral sensor 20 are not limited. For example, the peripheral sensor 20 (imaging device 21 and distance sensor 22) disposed facing toward any direction such as the rear, the side, or the like of the vehicle 10 may be used. Note that the peripheral sensor 20 is configured by a sensor included in a data acquisition unit 102, which will be described later. In this embodiment, the peripheral sensor 20 corresponds to a sensor unit.

FIG. 2 is a block diagram illustrating a configuration example of a vehicle control system 100 that controls the vehicle 10. The vehicle control system 100 is a system that is installed in the vehicle 10 and that controls the vehicle 10 in various ways. Note that, hereinafter, the vehicle 10 is referred to as an own car or an own vehicle in the case of distinguishing the vehicle 10 from other vehicles.

The vehicle control system 100 includes an input unit 101, a data acquisition unit 102, a communication unit 103, in-vehicle equipment 104, an output control unit 105, an output unit 106, a drivetrain control unit 107, a drivetrain system 108, a body control unit 109, a body system 110, a storage unit 111, and an autonomous driving control unit 112. The input unit 101, the data acquisition unit 102, the communication unit 103, the output control unit 105, the drivetrain control unit 107, the body control unit 109, the storage unit 111, and the autonomous driving control unit 112 are connected to each other via a communication network 121. For example, the communication network 121 includes a bus or a vehicle-mounted communication network compliant with any standard such as a controller area network (CAN), a local interconnect network (LIN), a local area network (LAN), FlexRay®, or the like. Note that sometimes the units of the vehicle control system 100 may be directly connected to each other without using the communication network 121.

Note that, hereinafter, description of the communication network 121 will be omitted in the case where the units of the vehicle control system 100 communicate with each other via the communication network 121. For example, simple description indicating that the input unit 101 and the autonomous driving control unit 112 communicate with each other will be given, in the case where the input unit 101 and the autonomous driving control unit 112 communicate with each other via the communication network 121.

The input unit 101 includes an apparatus used by a passenger to input various kinds of data, instructions, or the like. For example, the input unit 101 includes an operation device such as a touchscreen, a button, a microphone, a switch, or a lever, an operation device capable of inputting information by sound, gesture, or the like that is different from manual operation, or the like. Alternatively, for example, the input unit 101 may be external connection equipment such as a remote control apparatus using infrared or another radio wave, or mobile equipment or wearable equipment compatible with operation of the vehicle control system 100. The input unit 101 generates an input signal on the basis of data, an instruction, or the like input by a passenger, and supplies the generated input signal to the respective units of the vehicle control system 100.

The data acquisition unit 102 includes various kinds of sensors or the like for acquiring data to be used in processes performed by the vehicle control system 100, and supplies the acquired data to the respective units of the vehicle control system 100.

For example, the data acquisition unit 102 includes various kinds of sensors for detecting a state or the like of the vehicle 10. Specifically, for example, the data acquisition unit 102 includes a gyro sensor, an acceleration sensor, an inertial measurement unit (IMU), and sensors or the like for detecting an amount of operation of an accelerator pedal, an amount of operation of a brake pedal, an steering angle of a steering wheel, the number of revolutions of an engine, the number of revolutions of a motor, rotational speeds of wheels, and the like.

Further, for example, the data acquisition unit 102 includes various kinds of sensors for detecting information regarding the outside of the vehicle 10. Specifically, for example, the data acquisition unit 102 includes an imaging apparatus such as a time-of-flight (ToF) camera, a stereo camera, a monocular camera, an infrared camera, or another camera. Further, for example, the data acquisition unit 102 includes an environment sensor for detecting weather, a meteorological phenomenon, or the like, and a surrounding information detection sensor for detecting objects around the vehicle 10. For example, the environment sensor includes a raindrop sensor, a fog sensor, a sunshine sensor, a snow sensor, or the like. The surrounding information detection sensor includes an ultrasonic sensor, a radar, a LiDAR (Light Detection and Ranging, Laser Imaging Detection and Ranging) sensor, a sonar, or the like.

Furthermore, for example, the data acquisition unit 102 includes various kinds of sensors for detecting a current location of the vehicle 10. Specifically, for example, the data acquisition unit 102 includes a global navigation satellite system (GNSS) receiver or the like. The GNSS receiver receives satellite signals (hereinafter, referred to as GNSS signals) from a GNSS satellite serving as a navigation satellite.

Further, for example, the data acquisition unit 102 includes various kinds of sensors for detecting information regarding the inside of the vehicle 10. Specifically, for example, the data acquisition unit 102 includes an imaging apparatus that captures an image of a driver, a biological sensor that detects biological information of the driver, a microphone that collects sound within the interior of the vehicle, or the like. The biological sensor is, for example, disposed on a seat surface, the steering wheel, or the like, and detects biological information of a passenger sitting in a seat or the driver holding the steering wheel.

The communication unit 103 communicates with the in-vehicle equipment 104, various kinds of vehicle exterior equipment, a server, a base station, or the like, transmits data supplied by the respective units of the vehicle control system 100, and supplies the received data to the respective units of the vehicle control system 100. Note that a communication protocol supported by the communication unit 103 is not specifically limited. Further, it is also possible for the communication unit 103 to support a plurality of types of communication protocols.

For example, the communication unit 103 establishes wireless connection with the in-vehicle equipment 104 by using a wireless LAN, Bluetooth®, near-field communication (NFC), wireless USB (WUSB), or the like. Further, for example, the communication unit 103 establishes wired connection with the in-vehicle equipment 104 by using Universal Serial Bus (USB), High-Definition Multimedia Interface (HDMI), Mobile High-Definition Link (MHL), or the like via a connection terminal (and a cable if necessary) (not illustrated).

Furthermore, for example, the communication unit 103 communicates with equipment (for example, an application server or a control server) present on an external network (for example, the Internet, a cloud network, or a company-specific network) via a base station or an access point. Further, for example, the communication unit 103 communicates with a terminal (for example, a terminal of a pedestrian or a store, or a machine-type communication (MTC) terminal) present in the vicinity of the vehicle 10 by using a peer-to-peer (P2P) technology. Furthermore, for example, the communication unit 103 carries out V2X communication such as vehicle-to-vehicle communication, vehicle-to-infrastructure communication, vehicle-to-home communication between the vehicle 10 and a home, or vehicle-to-pedestrian communication.

Further, for example, the communication unit 103 includes a beacon receiver, receives a radio wave or an electromagnetic wave transmitted from a radio station installed on a road or the like, and acquires information regarding the current location, traffic congestion, traffic regulation, necessary time, or the like.

The in-vehicle equipment 104 includes mobile equipment or wearable equipment possessed by a passenger, information equipment carried into or attached to the vehicle 10, a navigation apparatus that searches for a route to any destination, and the like, for example.

The output control unit 105 controls output of various kinds of information to the passenger of the vehicle 10 or to an outside of the vehicle 10. For example, the output control unit 105 generates an output signal that includes at least one of visual information (such as image data) or audio information (such as sound data), supplies the output signal to the output unit 106, and thereby controls output of the visual information and the audio information from the output unit 106. Specifically, for example, the output control unit 105 combines pieces of image data captured by different imaging apparatuses included in the data acquisition unit 102, generates a bird's-eye image, a panoramic image, or the like, and supplies an output signal including the generated image to the output unit 106. Further, for example, the output control unit 105 generates sound data including warning sound, a warning message, or the like with regard to danger such as collision, contact, or entrance into a danger zone, and supplies an output signal including the generated sound data to the output unit 106.

The output unit 106 includes an apparatus capable of outputting the visual information or the audio information to the passenger or the outside of the vehicle 10. For example, the output unit 106 includes a display apparatus, an instrument panel, an audio speaker, headphones, a wearable device such as an eyeglass type display worn by the passenger or the like, a projector, a lamp, or the like. Instead of an apparatus including a usual display, the display apparatus included in the output unit 106 may be, for example, an apparatus that displays the visual information within a field of view of the driver such as a head-up display, a transparent display, or an apparatus having an augmented reality (AR) function.

The drivetrain control unit 107 generates various kinds of control signals, supplies them to the drivetrain system 108, and thereby controls the drivetrain system 108. Further, as necessary, the drivetrain control unit 107 supplies the control signals to structural elements other than the drivetrain system 108 and notifies them of a control state of the drivetrain system 108 or the like.

The drivetrain system 108 includes various kinds of apparatuses related to the drivetrain of the vehicle 10. For example, the drivetrain system 108 includes a driving force generation apparatus for generating driving force of an internal combustion engine, a driving motor, or the like, a driving force transmitting mechanism for transmitting the driving force to wheels, a steering mechanism for adjusting the steering angle, a braking apparatus for generating braking force, an anti-lock braking system (ABS), an electronic stability control (ESC) system, an electric power steering apparatus, or the like.

The body control unit 109 generates various kinds of control signals, supplies them to the body system 110, and thereby controls the body system 110. Further, as necessary, the body control unit 109 supplies the control signals to structural elements other than the body system 110 and notifies them of a control state of the body system 110 or the like.

The body system 110 includes various kinds of body apparatuses provided to a vehicle body. For example, the body system 110 includes a keyless entry system, a smart key system, a power window apparatus, a power seat, the steering wheel, an air conditioner, various kinds of lamps (such as headlamps, tail lamps, brake lamps, direction-indicator lamps, and fog lamps), and the like.

The storage unit 111 includes read only memory (ROM), random access memory (RAM), a magnetic storage device such as a hard disc drive (HDD) or the like, a semiconductor storage device, an optical storage device, a magneto-optical storage device, or the like, for example. The storage unit 111 stores various kinds of programs, data, and the like used by respective units of the vehicle control system 100. For example, the storage unit 111 stores map data such as a three-dimensional high-accuracy map, a global map, and a local map. The high-accuracy map is a dynamic map or the like. The global map has lower accuracy than the high-accuracy map but covers wider area than the high-accuracy map. The local map includes information regarding surroundings of the vehicle 10.

The autonomous driving control unit 112 performs control with regard to autonomous driving such as autonomous travel or driving assistance. Specifically, for example, the autonomous driving control unit 112 performs cooperative control intended to implement functions of an advanced driver-assistance system (ADAS) which include collision avoidance or shock mitigation for the vehicle 10, following driving based on a following distance, vehicle speed maintaining driving, a warning of collision of the vehicle 10, a warning of deviation of the vehicle 10 from a lane, or the like. Further, for example, it is also possible for the autonomous driving control unit 112 to perform cooperative control intended for autonomous driving that makes the vehicle travel autonomously without depending on the operation of the driver or the like. The autonomous driving control unit 112 includes a detection unit 131, a self-location estimation unit 132, a situation analysis unit 133, a planning unit 134, and a behavior control unit 135.

The autonomous driving control unit 112 corresponds to an information processing apparatus according to the present embodiment, and includes hardware necessary for a computer such as a CPU, RAM, and ROM, for example. An information processing method according to the present technology is executed when the CPU loads a program according to the present technology into the RAM and executes the program. The program is recorded on the ROM or the like in advance.

The specific configuration of the autonomous driving control unit 112 is not limited. For example, it is possible to use a programmable logic device (PLD) such as a field-programmable gate array (FPGA), or another device such as an application-specific integrated circuit (ASIC).

As illustrated in FIG. 2, the autonomous driving control unit 112 includes a detection unit 131, a self-location estimation unit 132, a situation analysis unit 133, a planning unit 134, and a behavior control unit 135. For example, each of the functional blocks is configured when a CPU of the autonomous driving control unit 112 executes a predetermined program.

The detection unit 131 detects various kinds of information necessary to control autonomous driving. The detection unit 131 includes a vehicle exterior information detection unit 141, a vehicle interior information detection unit 142, and a vehicle state detection unit 143.

The vehicle exterior information detection unit 141 performs a process of detecting information regarding an outside of the vehicle 10 on the basis of data or signals from the respective units of the vehicle control system 100. For example, the vehicle exterior information detection unit 141 performs a detection process, a recognition process, a tracking process of objects around the vehicle 10, and a process of detecting distances to the objects. Examples of the detection target object include a vehicle, a person, an obstacle, a structure, a road, a traffic light, a traffic sign, a road sign, and the like. Further, for example, the vehicle exterior information detection unit 141 performs a process of detecting an ambient environment around the vehicle 10. Examples of the ambient environment around the detection target include weather, temperature, humidity, brightness, a road surface condition, and the like, for example. The vehicle exterior information detection unit 141 supplies data indicating results of the detection processes to the self-location estimation unit 132, a map analysis unit 151, a traffic rule recognition unit 152, and a situation recognition unit 153 of the situation analysis unit 133, an emergency event avoiding unit 171 of the behavior control unit 135, and the like.

Further, in this embodiment, the vehicle exterior information detection unit 141 generates learning data used for machine learning. Therefore, the vehicle exterior information detection unit 141 can execute each of a process of detecting information outside the vehicle 10 and a process of generating learning data. The vehicle exterior information detection unit 141 will be described later in detail with reference to FIG. 3 and the like.

The vehicle interior information detection unit 142 performs a process of detecting information regarding an inside of the vehicle on the basis of data or signals from the respective units of the vehicle control system 100. For example, the vehicle interior information detection unit 142 performs an authentication process and a recognition process of the driver, a detection process of a state of the driver, a detection process of a passenger, a detection process of a vehicle interior environment, and the like. Examples of the state of the driver, which is a detection target, include a health condition, a degree of consciousness, a degree of concentration, a degree of fatigue, a gaze direction, and the like. Examples of the vehicle interior environment, which is a detection target, include temperature, humidity, brightness, smell, and the like. The vehicle interior information detection unit 142 supplies data indicating results of the detection processes to the situation recognition unit 153 of the situation analysis unit 133, the emergency event avoiding unit 171 of the behavior control unit 135, and the like.

The vehicle state detection unit 143 performs a process of detecting a state of the vehicle 10 on the basis of data or signals from the respective units of the vehicle control system 100. Examples of the state of the vehicle 10, which is a detection target, includes speed, acceleration, a steering angle, presence/absence of abnormality, a content of the abnormality, a driving operation state, a position and inclination of the power seat, a state of a door lock, states of other vehicle-mounted equipment, and the like. The vehicle state detection unit 143 supplies data indicating results of the detection processes to the situation recognition unit 153 of the situation analysis unit 133, the emergency event avoiding unit 171 of the behavior control unit 135, and the like.

The self-location estimation unit 132 performs a process of estimating a location, a posture, and the like of the vehicle 10 on the basis of data or signals from the respective units of the vehicle control system 100 such as the vehicle exterior information detection unit 141 and the situation recognition unit 153 of the situation analysis unit 133. Further, as necessary, the self-location estimation unit 132 generates a local map (hereinafter, referred to as a self-location estimation map) to be used for estimating a self-location. For example, the self-location estimation map may be a high-accuracy map using a technology such as simultaneous localization and mapping (SLAM). The self-location estimation unit 132 supplies data indicating a result of the estimation process to the map analysis unit 151, the traffic rule recognition unit 152, and the situation recognition unit 153 of the situation analysis unit 133, and the like. Further, the self-location estimation unit 132 causes the storage unit 111 to store the self-location estimation map.

Hereinafter, the process of estimating the location, the posture, and the like of the vehicle 10 will be referred to as a self-location estimation process in some cases. Further, the information of the location and the posture of the vehicle 10 will be described as location/posture information. Therefore, the self-location estimation process executed by the self-location estimation unit 132 is a process of estimating the location/posture information of the vehicle 10.

The situation analysis unit 133 performs a process of analyzing a situation of the vehicle 10 and a situation around the vehicle 10. The situation analysis unit 133 includes the map analysis unit 151, the traffic rule recognition unit 152, the situation recognition unit 153, and a situation prediction unit 154.

The map analysis unit 151 performs a process of analyzing various kinds of maps stored in the storage unit 111 and constructs a map including information necessary for an autonomous driving process while using data or signals from the respective units of the vehicle control system 100 such as the self-location estimation unit 132 and the vehicle exterior information detection unit 141 as necessary. The map analysis unit 151 supplies the constructed map to the traffic rule recognition unit 152, the situation recognition unit 153, and the situation prediction unit 154, and to a route planning unit 161, an action planning unit 162, a behavior planning unit 163 of the planning unit 134, and the like.

The traffic rule recognition unit 152 performs a process of recognizing traffic rules around the vehicle 10 on the basis of data or signals from the respective units of the vehicle control system 100 such as the self-location estimation unit 132, the vehicle exterior information detection unit 141, and the map analysis unit 151. The recognition process makes it possible to recognize locations and states of traffic lights around the vehicle 10, contents of traffic control around the vehicle 10, a drivable lane, and the like, for example. The traffic rule recognition unit 152 supplies data indicating a result of the recognition process to the situation prediction unit 154 and the like.

The situation recognition unit 153 performs a process of recognizing situations related to the vehicle 10 on the basis of data or signals from the respective units of the vehicle control system 100 such as the self-location estimation unit 132, the vehicle exterior information detection unit 141, the vehicle interior information detection unit 142, the vehicle condition detection unit 143, and the map analysis unit 151. For example, the situation recognition unit 153 performs a process of recognizing a situation of the vehicle 10, a situation around the vehicle 10, a situation of the driver of the vehicle 10, and the like. Further, as necessary, the situation recognition unit 153 generates a local map (hereinafter, referred to as a situation recognition map) to be used for recognizing the situation around the vehicle 10. For example, the situation recognition map may be an occupancy grid map.

Examples of the situation of the vehicle 10, which is a recognition target, include a location, a posture, and movement (such as speed, acceleration, or a movement direction, for example) of the vehicle 10, presence/absence of abnormality, contents of the abnormality, and the like. Examples of the situation around the vehicle 10, which is a recognition target, include types and locations of surrounding still objects, types, locations, and movement (such as speed, acceleration, and movement directions, for example) of surrounding moving objects, structures of surrounding roads, conditions of road surfaces, ambient weather, temperature, humidity, brightness, and the like. Examples of the state of the driver, which is a recognition target, include a health condition, a degree of consciousness, a degree of concentration, a degree of fatigue, movement of gaze, driving operation, and the like.

The situation recognition unit 153 supplies data indicating a result of the recognition process (including the situation recognition map as necessary) to the self-location estimation unit 132, the situation prediction unit 154, and the like. Further, the situation recognition unit 153 causes the storage unit 111 to store the situation recognition map.

The situation prediction unit 154 performs a process of predicting a situation related to the vehicle 10 on the basis of data or signals from the respective units of the vehicle control system 100 such as the map analysis unit 151, the traffic rule recognition unit 152, and the situation recognition unit 153. For example, the situation prediction unit 154 performs a process of predicting a situation of the vehicle 10, a situation around the vehicle 10, a situation of the driver, and the like.

Examples of the situation of the vehicle 10, which is a prediction target, includes behavior of the vehicle, occurrence of abnormality, a drivable distance, and the like. Examples of the situation around the vehicle 10, which is a prediction target, includes behavior of moving objects, change in states of traffic lights, change in environments such as weather, and the like around the vehicle 10. Examples of the situation of the driver, which is a prediction target, include behavior, a health condition, and the like of the driver.

The situation prediction unit 154 supplies data indicating results of the prediction processes to the route planning unit 161, the action planning unit 162, and the behavior planning unit 163 of the planning unit 134 and the like in addition to the data from the traffic rule recognition unit 152 and the situation recognition unit 153.

The route planning unit 161 plans a route to a destination on the basis of data or signals from the respective units of the vehicle control system 100 such as the map analysis unit 151 and the situation prediction unit 154. For example, the route planning unit 161 sets a route from the current location to a specified destination on the basis of the global map. Further, for example, the route planning unit 161 appropriately changes the route on the basis of situations such as traffic congestion, accidents, traffic regulation, and constructions, and a health condition and the like of the driver. The route planning unit 161 supplies data indicating the planned route to the action planning unit 162 and the like.

The action planning unit 162 plans an action of the vehicle 10 for driving safely in the route planned by the route planning unit 161 within a planned time period, on the basis of data or signals from the respective units of the vehicle control system 100 such as the map analysis unit 151 and the situation prediction unit 154. For example, the action planning unit 162 plans start, stop, a driving direction (for example, forward, backward, left turn, right turn, change of direction, etc.), a driving lane, driving speed, overtaking, and the like. The action planning unit 162 supplies data indicating the action planned for the vehicle 10 to the behavior planning unit 163 and the like.

The behavior planning unit 163 plans behavior of the vehicle 10 for achieving the action planned by the action planning unit 162 on the basis of data or signals from the respective units of the vehicle control system 100 such as the map analysis unit 151 and the situation prediction unit 154. For example, the behavior planning unit 163 plans acceleration, deceleration, a driving course, and the like. The behavior planning unit 163 supplies data indicating the planed behavior of the vehicle 10 to an acceleration/deceleration control unit 172, a direction control unit 173, and the like of the behavior control unit 135.

The behavior control unit 135 controls behavior of the vehicle 10. The behavior control unit 135 includes the emergency event avoiding unit 171, the acceleration/deceleration control unit 172, and the direction control unit 173.

The emergency event avoiding unit 171 performs a process of detecting collision, contact, entrance into a danger zone, or an emergency event such as abnormality in the driver or abnormality in the vehicle 10 on the basis of detection results obtained by the vehicle exterior information detection unit 141, the vehicle interior information detection unit 142, and the vehicle state detection unit 143. In the case where occurrence of an emergency event is detected, the emergency event avoiding unit 171 plans behavior of the vehicle 10 such as a quick stop or a quick turn for avoiding the emergency event. The emergency event avoiding unit 171 supplies data indicating the planned behavior of the vehicle 10 to the acceleration/deceleration control unit 172, the direction control unit 173, and the like.

The acceleration/deceleration control unit 172 controls acceleration/deceleration to achieve the behavior of the vehicle 10 planned by the behavior planning unit 163 or the emergency event avoiding unit 171. For example, the acceleration/deceleration control unit 172 computes a control goal value of the driving force generation apparatus or the braking apparatus to achieve the planned acceleration, deceleration, or quick stop, and supplies a control instruction indicating the computed control goal value to the drivetrain control unit 107.

The direction control unit 173 controls a direction to achieve the behavior of the vehicle 10 planned by the behavior planning unit 163 or the emergency event avoiding unit 171. For example, the direction control unit 173 computes a control goal value of the steering mechanism to achieve a driving course or quick turn planned by the behavior planning unit 163 or the emergency event avoiding unit 171, and supplies a control instruction indicating the computed control goal value to the drivetrain control unit 107.

Figures 3, 4:
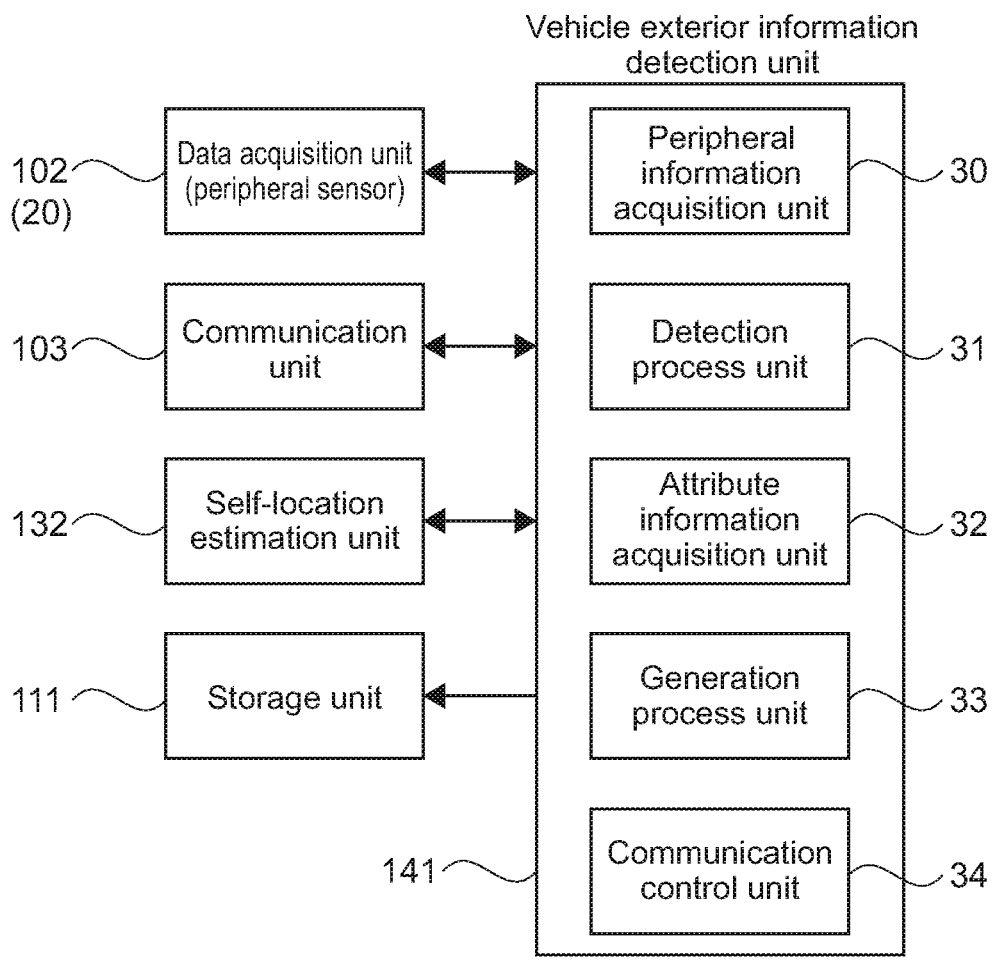
FIG. 3 is a block diagram illustrating a configuration example of a vehicle exterior information detection unit illustrated in FIG. 2.
FIG. 4 is a schematic diagram illustrating a configuration example of learning data.

FIG. 3 is a block diagram illustrating a configuration example of the vehicle exterior information detection unit 141 illustrated in FIG. 2. The vehicle exterior information detection unit 141 includes a peripheral information acquisition unit 30, a detection process unit 31, an attribute information acquisition unit 32, a generation process unit 33, and a communication control unit 34. Further, the vehicle exterior information detection unit 141 is connected to the data acquisition unit 102, the communication unit 103, and the storage unit 111 via the communication network 121. In FIG. 3, the illustration of the communication network 121 illustrated in FIG. 2 is omitted. Further, the vehicle exterior information detection unit 141 is connected to the self-location estimation unit 132 described with reference to FIG. 2.

The peripheral information acquisition unit 30 acquires peripheral information regarding the periphery of the vehicle 10. Specifically, the peripheral information detected by the peripheral sensor 20 (such as imaging device 21 and distance sensor 22) included in the data acquisition unit 102 is appropriately read through the communication network 121. For example, the image information constituting an image of the front side of the vehicle 10 captured by the imaging device 21 is read as peripheral information. Further, for example, the depth information (point group data and the like) of the front side of the vehicle 10 measured by the distance sensor 22 is read as peripheral information. In this embodiment, the peripheral information acquisition unit 30 corresponds to a first acquisition unit.

The detection process unit 31 detects a peripheral vehicle present around the vehicle 10. In this embodiment, a detection process for detecting a peripheral vehicle from the image of the front side of the vehicle 10 is performed. Therefore, the peripheral vehicle imaged by the imaging device 21, i.e. the peripheral vehicle appearing in the image of the front side of the vehicle 10 will be detected. Further, the detection process unit 31 is capable of detecting information, with which a peripheral vehicle can be identified, such as a license plate of the peripheral vehicle. Therefore, it can also be said that the detection process unit 31 identifies the peripheral vehicle present around the vehicle 10.

The method of detecting the peripheral vehicle, the license plate, or the like is not limited, and any algorithm for executing a process such as pattern matching, character recognition, or the like may be used, for example. Further, a process of detecting peripheral vehicles using machine learning or the like may be appropriately executed. Note that, in a case where a detection process using machine learning is executed, learning data to be described later may be used for training of the detection process. In addition, any process capable of detecting a peripheral vehicle may be executed.

Further, the detection process unit 31 can execute not only the detection process of the peripheral vehicle but also a recognition process of recognizing the type of a peripheral vehicle or the like, a tracking process of a peripheral vehicle, and the like. Further, the detection process unit 31 can also detect objects (pedestrians, obstacles, structures, and the like) around the vehicle 10 other than the peripheral vehicle.

Hereinafter, the vehicle 10 including the autonomous driving control unit 112 is referred to as an own vehicle 10 in some cases. Further, the peripheral vehicle detected by the detection process unit 31 is referred to as a detected vehicle in some cases (see FIG. 5). In this embodiment, the own vehicle 10 corresponds to a first mobile object, and the peripheral vehicle including the detected vehicle corresponds to a second mobile object. Further, the detection process unit 31 functions as a detection unit.

The attribute information acquisition unit 32 acquires attribute information regarding an attribute of a peripheral vehicle present in the vicinity of the own vehicle 10, from an apparatus different from the own vehicle 10. For example, the attribute information of the peripheral vehicle is acquired by communication with an apparatus provided outside of the own vehicle 10 and capable of generating attribute information of a peripheral vehicle.

In this embodiment, the attribute information acquisition unit 32 acquires attribute information regarding an attribute of a peripheral vehicle from the peripheral vehicle present in the vicinity of the own vehicle 10. Therefore, in this embodiment, the apparatus different from the own vehicle 10 is the peripheral vehicle present in the periphery of the own vehicle 10.

Further, in this embodiment, the attribute information acquisition unit 32 is capable of acquiring the attribute information of the detected vehicle detected by the detection process unit 31. That is, it is possible to identify the peripheral vehicle appearing in the image of the front side of the own vehicle 10 and acquiring attribute information regarding the identified peripheral vehicle (detected vehicle).

The attribute information is information including a posture, a location, a vehicle type, a model, and the like of the peripheral vehicle. Therefore, it can also be said that the attribute information is information indicating attributes of the peripheral vehicle, such as a state (posture and location) and characteristics (vehicle type and model). Note that the method of representing the posture and location of the peripheral vehicle or the like is not limited. For example, the posture information and location information regarding the posture and location of the peripheral vehicle, such as an absolute posture and an absolute location on a predetermined map, a relative posture and a relative location relative to a predetermined reference, may be appropriately used.

A specific configuration of the attribute information is not limited. For example, information regarding the motion state of the peripheral vehicle, such as speed, acceleration, and a traveling direction, may be acquired. Further, for example, information such as the color, the size (overall length, overall width, and overall height), the shape, and the like of the peripheral vehicle may be acquired as the attribute information. In addition, any information indicating the state, characteristics, and the like of the peripheral vehicle may be included in the attribute information.

For example, vehicle-to-vehicle communication (V2V communication) with the peripheral vehicle is used to acquire the attribute information. For example, the communication unit 103 executes the V2V communication with the peripheral vehicle and receives the attribute information of the peripheral vehicle. The attribute information received by the communication unit 103 is read by the attribute information acquisition unit 32 via the communication network 121. The method of acquiring the attribute information is not limited, and transmission and reception of data to and from the peripheral vehicle may be performed using, for example, wireless communication of any method. In this embodiment, the attribute information acquisition unit 32 corresponds to a second acquisition unit.

The generation process unit 33 generates learning data for extracting attributes of a target vehicle on the basis of the acquired peripheral information and attribute information. Here, the target vehicle is a vehicle to be subjected to a predetermined process using machine learning that can be used for vehicle control or the like, for example. Further, the learning data is data to be used for training a learning device (such as process block) having a machine learning function.

For example, by using machine learning, it is possible to configure a learning device that executes various processes including extraction of attributes of a vehicle from an image obtained by imaging the vehicle. In this case, for example, a vehicle that appears in an image input to the learning device and from which attributes are extracted becomes a target vehicle for a process using machine learning. In the present disclosure, the target vehicle includes a general vehicle, i.e., any vehicle. Therefore, for example, a vehicle including the own vehicle 10, the peripheral vehicle, or the like may be a target vehicle. Further, in this embodiment, the target vehicle corresponds to a target mobile object.

FIG. 4 is a schematic diagram illustrating a configuration example of the learning data. Learning data 40 is data in which peripheral information 41 and label information 42 are associated with each other. As illustrated in FIG. 4, the learning data 40 includes an identification ID for identifying data, the peripheral information 41, and the label information 42. At least one of the image information or the depth information is used as the peripheral information 41. Further, for example, information indicating attributes of a peripheral vehicle to be extracted from the peripheral information 41 is used as the label information 42.

In this embodiment, the label information 42 associated with the peripheral information 41 is generated by the generation process unit 33 on the basis of the attribute information of the peripheral vehicle. Specifically, the label information 42 is generated by using the attribute information of a detected vehicle, which is the peripheral vehicle detected by the detection process unit 31 (see FIG. 5). In the example illustrated in FIG. 4, the label information 42 includes information indicating attributes of the detected vehicle, such as a posture value, a vehicle type, and a model of the detected vehicle.

The posture value of the detected vehicle is, for example, a value representing the posture of the detected vehicle to be extracted from the peripheral information. In this embodiment, a relative posture of the detected vehicle relative to the own vehicle 10 is calculated as the label information on the basis of the posture information of the own vehicle 10 and the posture information of the detected vehicle. Such a relative posture is used as the posture value of the detected vehicle.

The posture information of the own vehicle 10 is calculated by the self-location estimation unit 132 illustrated in FIGS. 2 and 3. Further, the posture information of the detected vehicle is acquired as the attribute information. In this embodiment, the posture information of the own vehicle 10 corresponds to first posture information, and the posture information of the detected vehicle corresponds to second posture information. Further, in this embodiment, the self-location estimation unit 132 functions as a calculation unit. The method of calculating the relative posture will be described later in detail.

Information such as the vehicle type and the model of the detected vehicle is generated from the attribute information acquired through V2V communication or the like. That is, the information such as the vehicle type and the model acquired as the attribute information is used as it is as the label information. The specific configuration of the learning data 40 is not limited. For example, at least one piece of information of the attributes such as a posture value, a vehicle type, and a model of the detected vehicle may be used as the label information 42 of the learning data 40.

For example, it is assumed that the attributes (posture value, vehicle type, model, and the like) of the detected vehicle are extracted from the learning data 40 (peripheral information 41) by using machine learning. In this case, by using the label information 42, it is possible to determine, for example, whether an extraction result is correct or incorrect, or an error of the extraction result. In such a manner, it can also be said that the label information 42 is information indicating a solution regarding the output of the learning device to which the peripheral information 41 is input.

A determination result based on the label information 42 is appropriately fed back to a learning algorithm or the like of machine learning, and training of a process of extracting attributes is performed. As described above, the learning data 40 is labeled learning data for machine learning such as supervised learning or semi-supervised learning.

Examples of the learning device include process blocks such as the situation recognition unit 153 and the situation prediction unit 154 illustrated in FIG. 2, and the detection process unit 31 described above. Further, the present technology is not limited to the process block mounted on the own vehicle 10, and the learning data 40 generated by the generation process unit 33 can be used also when other vehicles different from the own vehicle 10 or other systems perform training of machine learning or the like.

Referring back to FIG. 3, the communication control unit 34 controls communication for acquiring the peripheral information and the attribute information. For example, the communication control unit 34 is capable of outputting a control signal or the like for instructing the peripheral sensor 20 (imaging device 21 and distance sensor 22) to execute detection of peripheral information. Further, the communication control unit 34 is capable of outputting a control signal or the like for instructing the peripheral vehicle to execute generation of attribute information, via the communication unit 103 or the like.

Further, the communication control unit 34 controls a timing at which the peripheral information 41 is detected in accordance with a timing at which the attribute information is generated. Thus, for example, the peripheral information 41 or the like can be acquired in accordance with the generation timing of the attribute information, and accurate label information 42 can be generated. In this embodiment, the communication control unit 34 corresponds to a timing control unit.

Figure 5:
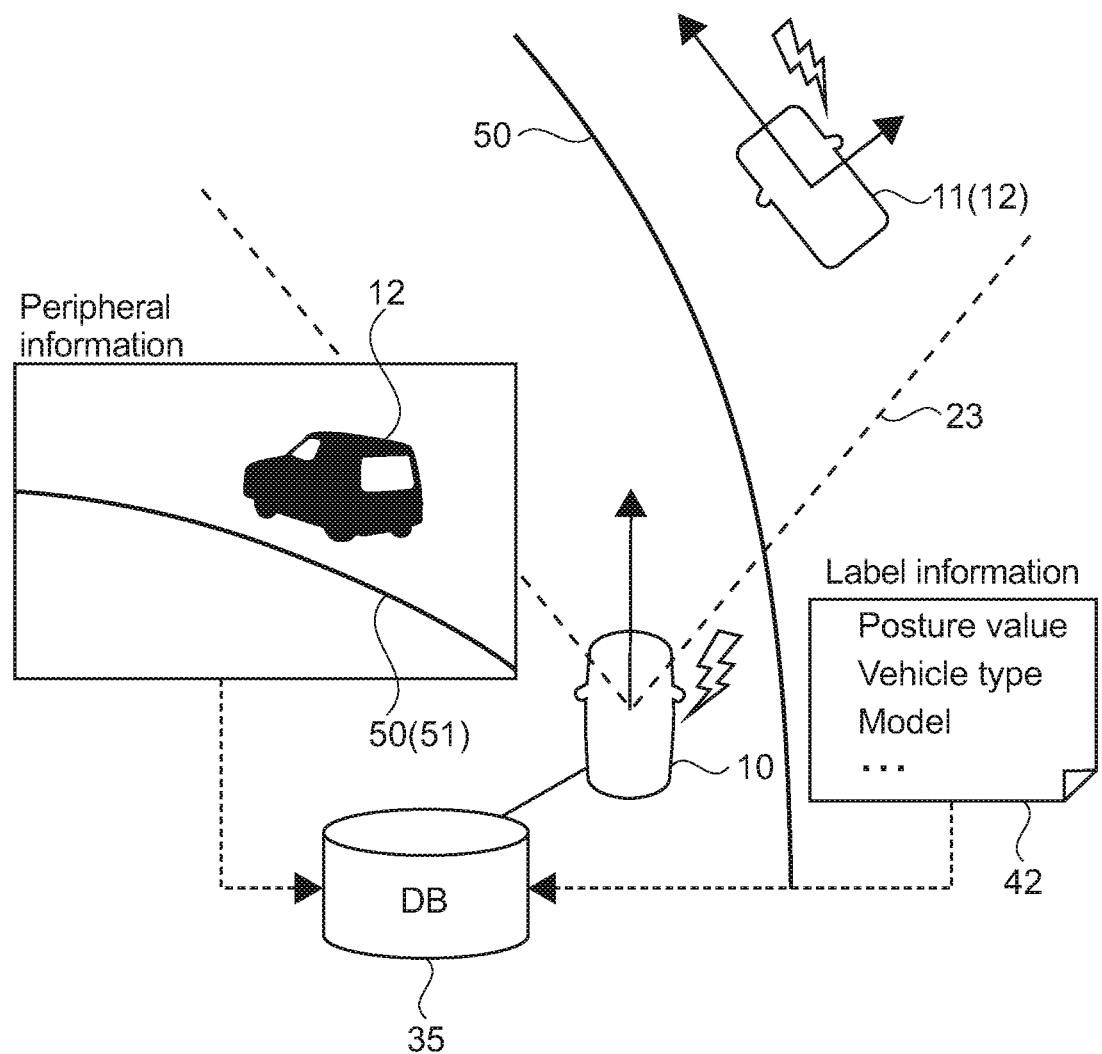
FIG. 5 is a schematic diagram illustrating a basic operation example of the vehicle exterior information detection unit.

FIG. 5 is a schematic diagram illustrating a basic operation example of the vehicle exterior information detection unit 141. FIG. 5 schematically illustrates the own vehicle 10 that travels on a curved road and a peripheral vehicle 11 that travels in front of the own vehicle 10. Further, in FIG. 5, an imaging range 23 by the imaging device 21 mounted on the own vehicle 10 is illustrated by a dotted line.

For example, the imaging device 21 mounted on the own vehicle 10 captures an image of the front side of the own vehicle 10. At this time, if the peripheral vehicle 11 is present in the imaging range 23 of the imaging device 21, the detection process unit 31 detects the peripheral vehicle 11 from the image of the front side. Hereinafter, the detected peripheral vehicle 11 is referred to as a detected vehicle 12. The communication control unit 34 appropriately executes V2V communication with the detected vehicle 12, and the attribute information acquisition unit 32 acquires the attribute information regarding the attributes of the detected vehicle 12.

Further, the imaging device 21 and the distance sensor (peripheral sensor 20) detect, in accordance with a timing at which the attribute information of the detected vehicle 12 is generated, the image information and the depth information (peripheral information 41) of the front side of the own vehicle 10. FIG. 5 schematically illustrates, as an example of the peripheral information 41, an image 43 of the front side of the own vehicle 10, which is detected at a timing at which the attribute information is generated.

The generation process unit 33 generates the label information 42 on the basis of the attribute information of the detected vehicle 12. FIG. 5 schematically illustrates the label information 42. When the label information 42 is generated, the learning data 40 is generated on the basis of the peripheral information of the own vehicle 10 and the attribute information of the detected vehicle 12.

In such a manner, through the V2V communication with the detected vehicle 12 detected by using the imaging device 21 of the own vehicle 10, the vehicle exterior information detection unit 141 acquires the attribute information (posture information and the like) of the detected vehicle 12. Subsequently, the attribute information is associated with the peripheral information 41 such as image information and depth information detected at the same time, and the learning data 40 is generated. Thus, the learning data 40 can be easily generated, and for example, a large amount of learning data 40 generated on the basis of actual driving environments can be automatically generated.

The generated learning data 40 is saved in a database 35 configured in the storage unit 111 of the own vehicle 10 and is used for training or the like of a learning device having a machine learning function. Alternatively, the learning data 40 may be uploaded to a server or the like on a cloud network connected through the communication unit 103 to construct the database 35. Thus, it is possible to train the learning device or the like of not only the own vehicle 10 but also a vehicle other than the own vehicle 10.

Figure 6:
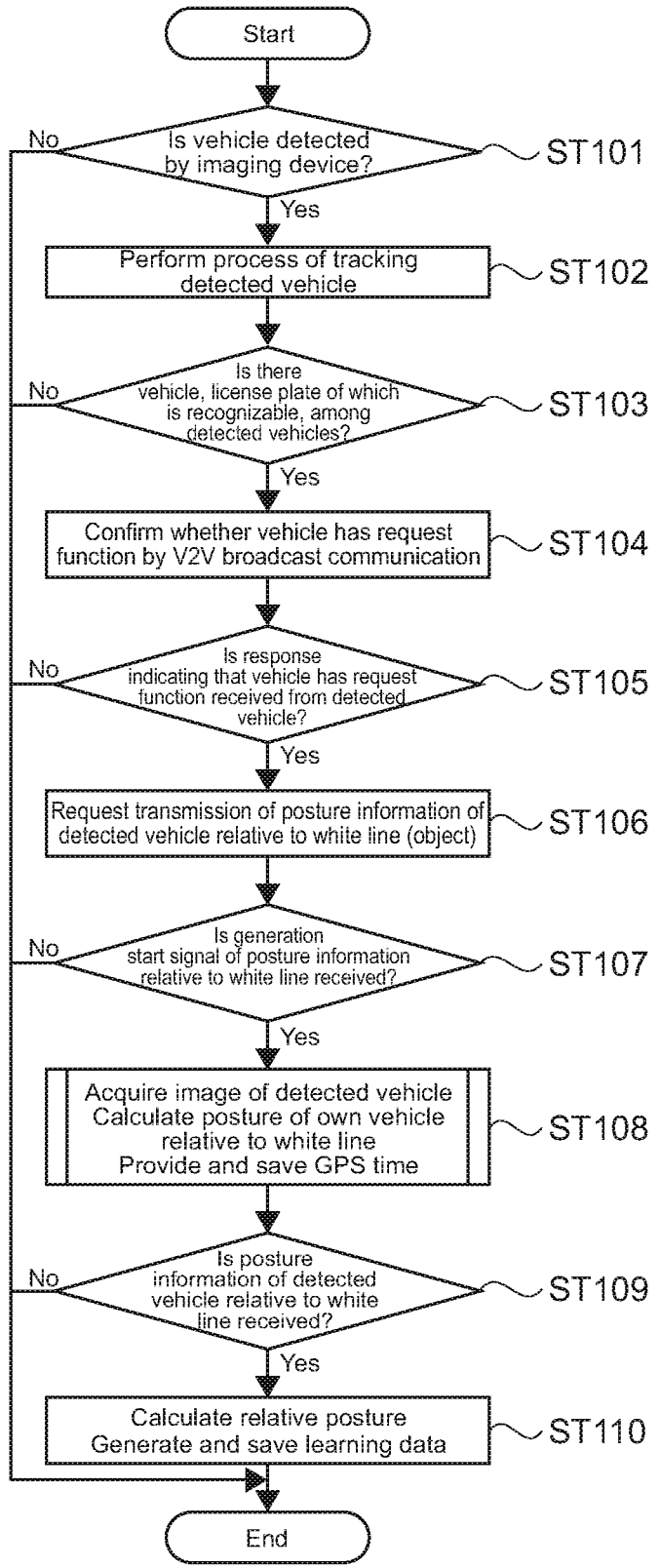
FIG. 6 is a flowchart of an example of a process of generating learning data.
Figure 7:
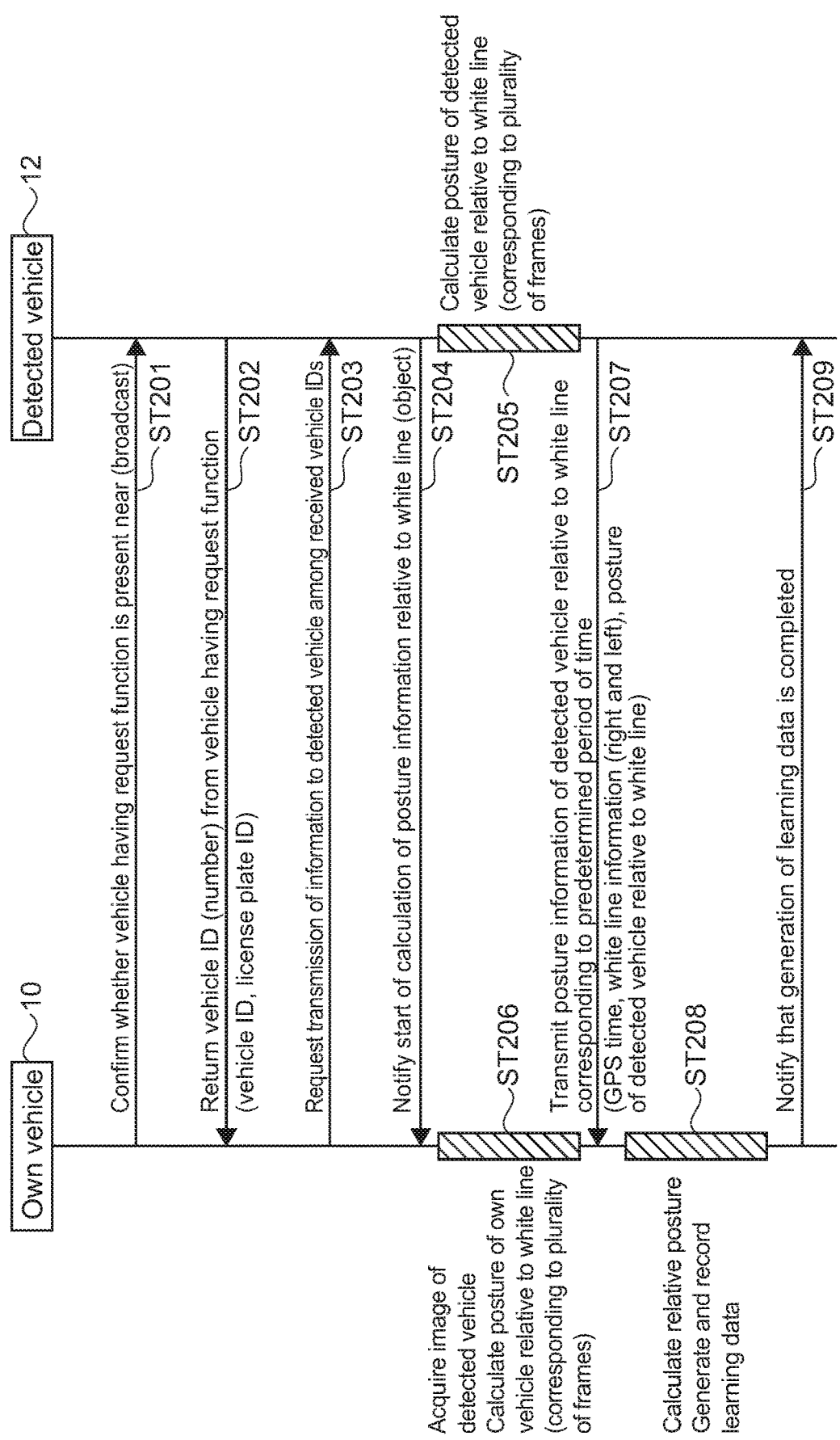
FIG. 7 is a sequence diagram illustrating an example of the process of generating learning data.

FIG. 6 is a flowchart of an example of a process of generating the learning data 40. FIG. 7 is a sequence diagram illustrating an example of a process of generating the learning data 40. The generation process in FIG. 6 is, for example, a loop process repeatedly executed during the operation of the own vehicle 10. Further, the sequence diagram illustrated in FIG. 7 illustrates a communication flow between the own vehicle 10 and the detected vehicle 12 when the generation process in FIG. 6 is executed. Hereinafter, the process of generating the learning data 40 will be described in detail with reference to FIGS. 6 and 7.

As illustrated in FIG. 6, first, it is determined whether the peripheral vehicle 11 is detected by the imaging device 21 or not (Step 101). For example, the detection process unit 31 executes the detection process of a vehicle on the image of the front side of the own vehicle 10, which is captured by the imaging device 21. On the basis of a detection result of the detection process, it is determined whether or not the peripheral vehicle 11 has been detected.

Note that, in the detection process, in a case where a plurality of peripheral vehicles 11 is present in the imaging range 23, each peripheral vehicle 11 can be detected. Thus, a plurality of detected vehicles 12 may be detected. In this case, for example, a process to be described below is performed for each of the plurality of detected vehicles 12.

If no peripheral vehicle 11 is detected from the image of the front side of the own vehicle 10 (No in Step 101), the next loop process is executed. Note that a case where no peripheral vehicle 11 is detected is, for example, a case where no peripheral vehicle 11 is present in the imaging range 23 of the imaging device 21, a case where no peripheral vehicle 11 is detected because the peripheral vehicle 11 is far and the size thereof in the image is small, or the like. In such a case, the learning data 40 is not generated.

If a peripheral vehicle 11 is detected from the image of the front side of the own vehicle 10 (Yes in Step 101), a process of tracking the detected vehicle 12 is executed (Step 102). The tracking process is, for example, a process of tracking the detected vehicle 12 that appears in continuous images (images of the front side of the own vehicle 10) output at a predetermined frame rate from the imaging device 21. For example, the tracking process (tracking) is executed by sequentially calculating the location, the contour, and the like of the detected vehicle 12 in each image.

It is determined whether or not there is a vehicle, the license plate of which is recognizable, among the detected vehicles 12 being tracked (in Step 103). For example, the detection process unit 31 executes a license plate recognition process on the detected vehicles 12 being tracked. If there is no detected vehicle 12, the license plate of which is recognizable (No in Step 103), the next loop process is executed.

If the detected vehicle 12, the license plate of which is recognizable, is present (Yes in Step 103), V2V communication is executed to confirm whether or not the detected vehicle 12 has a request function necessary for generating the learning data 40 (Step 104, Step 201). The request function necessary for generating the learning data 40 is, for example, a function of generating attribute information requested by the own vehicle 10 (vehicle exterior information detection unit 141). In the example illustrated in FIG. 6, a function or the like of generating the posture information of the detected vehicle 12 relative to a predetermined object to be described later is a request function.

Typically, it is confirmed whether or not the detected vehicle 12 has a function similar to that of the own vehicle 10. Note that the present technology is not limited to the case where the detected vehicle 12 has a function similar to that of the own vehicle 10, and the present technology is applicable to, for example, any vehicle capable of generating and transmitting attribute information requested by the own vehicle 10.

For example, the communication control unit 34 generates a signal (confirmation request signal) for confirming whether the detected vehicle 12 has a request function or not. The confirmation request signal is transmitted by broadcast communication using V2V communication toward the peripheral vehicle 11 present in the vicinity of the own vehicle 10. Therefore, the confirmation request signal will be transmitted also to the peripheral vehicles 11 other than the detected vehicle 12 (e.g., vehicle or the like traveling behind the own vehicle 10).

In the peripheral vehicle 11 that has received the confirmation request signal, whether the peripheral vehicle 11 itself has a request function or not is determined. For example, the peripheral vehicle 11 determined to have a request function generates a signal (acknowledgement signal) for notifying that the peripheral vehicle 11 has a request function. Note that the peripheral vehicle 11 that does not have a request function does not generate the acknowledgement signal or the like.

The generated acknowledgement signal is transmitted from the peripheral vehicle 11 having the request function toward the own vehicle 10. In FIGS. 6 and 7, the acknowledgement signal is transmitted from the detected vehicle 12 to the own vehicle 10 (Step 202). That is, the detected vehicle 12 is a vehicle having the request function.

Hereinafter, it is assumed that the detected vehicle 12 has a configuration similar to that of the own vehicle 10. That is, the detected vehicle 12 includes an imaging device for imaging the front side, a vehicle exterior information detection unit for detecting information regarding an outside of the vehicle 10, a self-location estimation unit for estimating a self-location, and the like. Note that the own vehicle 10 may receive an acknowledgement signal from a peripheral vehicle 11 having a request function other than the detected vehicle 12.

Figures 8, 9:
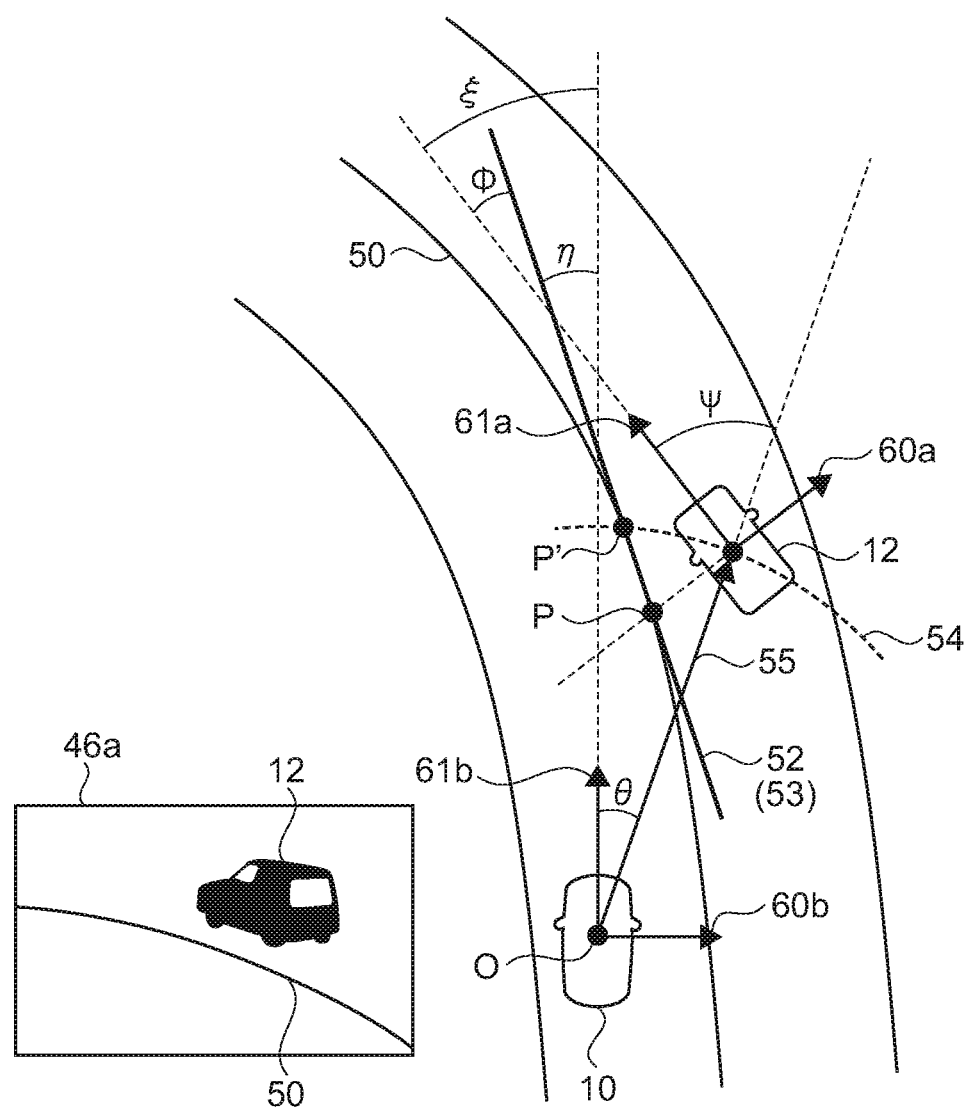
FIG. 8 is a schematic diagram illustrating an example of an acknowledgement signal.
FIG. 9 is a schematic diagram for describing an example of a process of calculating a relative posture.

FIG. 8 schematically illustrates an example of the acknowledgement signal. FIG. 8 illustrates a list of acknowledgement signals 44 received by the own vehicle 10. The acknowledgement signal 44 includes a vehicle ID, a GPS time, a vehicle type, a model, and a number. The vehicle ID is an ID for identifying a peripheral vehicle 11. The vehicle ID is used, for example, to identify a communication partner in communication with the own vehicle 10.

The GPS time is, for example, information indicating the time when the acknowledgement signal 44 is generated, and is given on the basis of a satellite signal transmitted from a navigation satellite (GNSS satellite). For example, a GPS time included in a predetermined satellite signal received at a timing at which the acknowledgement signal 44 is generated is given to the acknowledgement signal 44. Using the GPS time as a reference, for example, it is possible to synchronize the timing of a process executed in the own vehicle 10 with the timing of a process executed in the peripheral vehicle 11 with high accuracy. That is, it can also be said that the GPS time represents a common time in the own vehicle 10 and the peripheral vehicle 11.

The vehicle type is, for example, information indicating the type of the peripheral vehicle 11 such as minivan, SUV, sedan, or one box. The model is information indicating the model number or the like of the peripheral vehicle 11 assigned by a manufacturer or the like. The number is information described in the license plate of the peripheral vehicle 11. Thus, it can also be said that the acknowledgement signal 44 is a signal including attribute information 45 such as the characteristics of the peripheral vehicle 11.

Referring back to FIG. 6, it is determined whether or not a response from the detected vehicle 12, which indicates that the vehicle has a request function, has been received (Step 105). That is, it is determined whether or not the acknowledgement signal 44 from the detected vehicle 12 has been received.

For example, it is determined whether or not an acknowledgement signal 44 including information of a number that matches the content described on the license plate of the detected vehicle 12 has been received. In the example illustrated in FIG. 8, in a notification signal having the vehicle ID of 000001, it is assumed that the number (11-22) matches the license plate of the detected vehicle 12.

Thus, it is possible to confirm that the detected vehicle 12 that has been detected (tracked) using the imaging device 21 has a request function. Further, the attribute information 45 such as a vehicle ID (000001), a vehicle type (minivan), and a model (AA-11) of the detected vehicle 12 can be acquired. Note that if the acknowledgement signal 44 from the detected vehicle 12 is not received (No in Step 105), the next loop process is executed.

If the acknowledgement signal 44 from the detected vehicle 12 is received (Yes in Step 105), a signal (transmission request signal) requesting transmission of the attribute information 45 for calculating a relative posture (label information 42) is transmitted to the detected vehicle 12 (Step 106, Step 203).

In this embodiment, the posture information of the detected vehicle 12 is generated with a predetermined object being as a reference, and a notification indicating that the posture information is to be transmitted is requested. In this case, the posture information to be generated of the detected vehicle 12 is attribute information for calculating the relative posture. That is, the attribute information includes posture information regarding the posture of the detected vehicle 12.

As will be described later, the generation process unit 33 calculates the relative posture on the basis of the posture information of each of the detected vehicle 12 and the own vehicle 10 with a predetermined object being as a reference. Therefore, it can also be said that the predetermined object serves as a reference for calculating the relative posture. In this embodiment, the predetermined object corresponds to a reference object.

As the predetermined object, for example, an object, a structure, or the like detected by the peripheral sensor 20 is used. In this embodiment, a lane boundary line such as a white line for separating lanes on a road is used as a predetermined object. In the following description, the lane boundary line is referred to as a white line in some cases.

For example, in a situation where the detected vehicle 12 is detected or tracked, the front side of the own vehicle 10 is imaged using the imaging device 21. In this case, for example, as illustrated in FIG. 5, an image 43 (peripheral information 41) including the detected vehicle 12 and a white line 50 of a road on which the detected vehicle 12 travels is captured. The white line 50 of the road is used as a predetermined object 51.

As described above, the peripheral information 41 includes information of a predetermined object 51 (white line 50), which is to be a reference for calculating the relative posture. In other words, an object, a structure, or the like that can be detected as the peripheral information 41 is set as a predetermined object 51 to be a reference for calculating the relative posture.

Note that in an actual traffic environment, it is conceivable that the white lines 50 are present on both the right and left sides of the detected vehicle 12. Thus, in the transmission request signal, the transmission of the posture information of the detected vehicle 12 relative to the white line 50 closest to the detected vehicle 12, among the white lines 50 present on the right and left sides of the detected vehicle 12, is instructed. In this case, the posture information generated by the detected vehicle 12 includes information indicating which of the right and left white lines 50 has been used as a reference (see FIG. 10). That is, the posture information includes information indicating the position (left side/right side) of the white line 50 closest to the detected vehicle 12.

As described above, the transmission request signal includes information specifying the predetermined object 51. Further, the posture information of the detected vehicle 12 includes information for notifying an object used as a reference for the posture information. The method of specifying the predetermined object 51 or the like is not limited. For example, a transmission request signal or the like for specifying one of the right and left white lines 50 as the predetermined object 51 may be transmitted.

As illustrated in FIG. 7, when the transmission request signal is received in the detected vehicle 12, a signal (start notification signal) for notifying the start of a calculation process of the posture information of the detected vehicle 12 relative to the white line 50 (predetermined object 51) is transmitted toward the own vehicle 10 (Step 204), and the calculation process of the posture information of the detected vehicle 12 is executed (Step 205).

Further, as illustrated in FIG. 6, the own vehicle 10 determines whether or not the start notification signal from the detected vehicle 12 has been received (Step 107). For example, after transmission of the transmission request signal in Step 106, it is determined whether or not a response from the detected vehicle 12 (start notification signal) has been received during a predetermined period of time. If no start notification signal is received for a predetermined period of time (NO in Step 107), the next loop process is performed.

If a start notification signal is received during a predetermined period of time (Yes in Step 107), an image of the detected vehicle 12 is acquired, and the process of calculating the posture information of the own vehicle 10 relative to the white line 50 (predetermined object 51) is executed (Step 108, Step 206). Therefore, as illustrated in FIG. 7, the process of calculating the posture information of the detected vehicle 12, the imaging of the detected vehicle 12, and the process of calculating the posture information of the own vehicle 10 will be executed at substantially the same timing.

FIG. 9 is a schematic diagram for describing an example of the process of calculating the relative posture. FIG. 9 schematically illustrates a plan view of a road, on which the own vehicle 10 and the detected vehicle 12 travel, viewed from above.

Hereinafter, the lateral direction and the front-back direction of the detected vehicle 12 are referred to as an X-axis 60*a* and a Y-axis 61*a* of the detected vehicle 12. Note that the X-axis 60*a* and the Y-axis 61*a* of the detected vehicle 12 are set with the center of the detected vehicle 12 being as a reference. Similarly, the lateral direction and the front-back direction of the own vehicle 10 are referred to as an X-axis 60*b* and a Y-axis 61*b* of the own vehicle 10. Further, the X-axis 60*b* and the Y-axis 61*b* of the own vehicle 10 are set with the center of the own vehicle 10 being as a reference.

First, the calculation of the posture information of the detected vehicle 12 will be described. In Step 205, with the predetermined object 51 specified by the transmission request signal, i.e., the white line 50 closest to the detected vehicle 12 being as a reference, the posture is calculated as the posture information of the detected vehicle 12. That is, the posture information of the detected vehicle 12 is information of the posture of the detected vehicle 12 relative to the white line 50.

For example, an image of the periphery of the detected vehicle 12 is captured by using an imaging device mounted on the detected vehicle 12. The vehicle exterior information detection unit of the detected vehicle 12 detects the white line 50 closest to the detected vehicle 12 from the image of the periphery of the detected vehicle 12. The self-location estimation unit of the detected vehicle 12 then calculates the posture of the detected vehicle 12 relative to the closest white line 50.

In this embodiment, the posture of the detected vehicle 12 is calculated with a tangent line of the white line 50 closest to the detected vehicle 12 being as a reference. For example, as illustrated in FIG. 9, a tangent line 52 of the white line 50 at an intersection P between the X-axis 60a of the detected vehicle 12 (lateral direction of detected vehicle 12) and the white line 50 is calculated. An angle φ between a direction of the calculated tangent line 52 and the Y-axis 61a of the detected vehicle 12 (front-rear direction of detected vehicle 12) is then calculated as the posture information of the detected vehicle 12.

Therefore, the posture information of the detected vehicle 12 is information (angle φ) of the posture of the detected vehicle 12 relative to the direction of the tangent line 52 of the closest white line 50. Note that the method of calculating the tangent line 52 of the white line 50 or the like is not limited. In this embodiment, the direction of the tangent line 52 of the closest white line 50 corresponds to a reference direction with the reference object being as a reference.

Figures 10, 11:
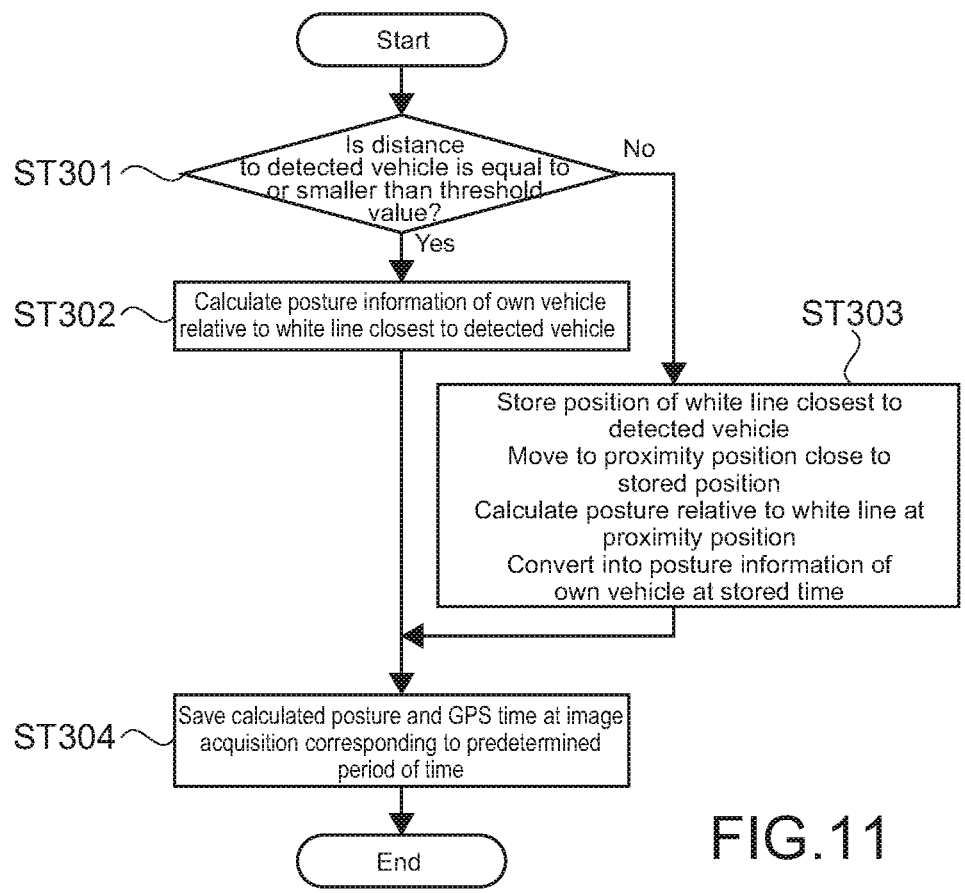
FIG. 10 is a schematic diagram illustrating an example of posture information of a detected vehicle.
FIG. 11 is a flowchart of an example of a process of calculating posture information of an own vehicle.

FIG. 10 is a schematic diagram illustrating an example of the posture information of the detected vehicle 12. As illustrated in FIG. 10, posture information 47 of the detected vehicle 12 includes a GPS time, a posture angle φ relative to the white line, and a position of the white line 50 relative to the detected vehicle 12.

The GPS time is, for example, the time at which an image is captured by the imaging device mounted on the detected vehicle 12. The posture angle φ relative to the white line 50 is an angle φ between the above-mentioned tangent line 52 of the white line 50 and the Y-axis 61a of the detected vehicle 12. That is, the posture angle φ is the information of the posture of the detected vehicle 12 relative to the white line 50 at the GPS time. Further, the position of the white line 50 relative to the detected vehicle 12 is a position of the white line 50 (position of the closest white line 50) that is a reference when the posture angle φ is calculated, and includes information indicating which of the right and left white lines 50 is set as a reference.

The detected vehicle 12 repeatedly executes the process of calculating the posture information 47 of the detected vehicle 12 for a predetermined period of time. That is, the detected vehicle 12 can continuously generate the posture information 47 (attribute information 45) of the detected vehicle 12. Therefore, in Step 205, the posture information 47 of the detected vehicle 12 corresponding to a plurality of frames is calculated and provided with a GPS time stamp. Such information obtained for a predetermined period of time is saved.

The example of FIG. 10 illustrates three pieces of posture information 47 of the detected vehicle 12 continuously calculated at intervals of 30 msec. The repetition period of time and the calculation interval may be set in advance, for example, or may be specified by a transmission request signal or the like transmitted in Step 106. Further, instead of the repetition period of time, the number of times of repetition and the like may be specified. The period of time, the number of times, the interval, and the like for calculating the posture information 47 of the detected vehicle 12 are not limited, and may be appropriately set, for example, such that the relative posture can be calculated with a desired accuracy.

As will be described later, the list of the posture information 47 of the detected vehicle 12 illustrated in FIG. 10 is transmitted to the own vehicle 10 and is read by the attribute information acquisition unit 32. Therefore, the attribute information acquisition unit 32 can acquire the GPS time regarding the timing at which the posture information 47 is generated. Thus, for example, it is possible to accurately select the posture angle φ or the like of the detected vehicle 12 at the timing when the detected vehicle 12 is imaged. This will be described later in detail.

FIG. 11 is a flowchart of an example of the process of calculating the posture information of the own vehicle 10. The process in FIG. 11 corresponds to the internal processes of Step 108 in FIG. 6 and Step 206 in FIG. 7.

It is determined whether or not the distance to the detected vehicle 12 is equal to or smaller than a predetermined threshold value (Step 301). The distance to the detected vehicle 12 is appropriately detected using, for example, a distance sensor such as a millimeter-wave radar, a LiDAR, or a stereo camera. The predetermined threshold value is appropriately set such that the posture information of the own vehicle 10 can be properly calculated, for example. The method of setting the predetermined threshold value or the like is not limited and may be set in accordance with, for example, the resolution, the angle of view, or the like of the imaging device 21.

If the distance to the detected vehicle 12 is equal to or smaller than a predetermined threshold value (Yes in Step 301), it is determined that the distance to the white line 50 closest to the detected vehicle 12 is sufficiently small. In this case, the image (peripheral information 41) of the detected vehicle 12 is acquired, and the posture information of the own vehicle 10 relative to the white line 50 closest to the detected vehicle 12 is calculated (Step 302).

FIG. 9 schematically illustrates an image 46a of the detected vehicle 12 that is captured at a point O, at which the distance to the detected vehicle 12 is equal to or smaller than a predetermined threshold value. Hereinafter, the point O is referred to as a detection position O. In Step 302, first, the image 46a of the detected vehicle 12 is captured, and a GPS time is acquired for the image 46a of the detected vehicle 12 on the basis of a GNSS signal received at a timing at which the image 46a is captured.

When the detected vehicle 12 is imaged, the self-location estimation unit 132 calculates the posture information of the own vehicle 10 on the basis of the image 46a (peripheral information 41) of the detected vehicle 12. In this embodiment, the posture of the own vehicle 10 is calculated with the white line 50 closest to the detected vehicle 12 specified as the predetermined object 51 being as a reference. That is, the posture information of the own vehicle 10 is information of the posture of the own vehicle 10 relative to the white line 50.

For example, the self-location estimation unit 132 generates a plan view (bird's-eye view) of the detected vehicle 12 and the own vehicle 10 viewed from above, from the image 46a of the detected vehicle 12. The plan view is generated by executing a coordinate transformation or the like for the image 46a of the detected vehicle 12, for example, on the basis of information such as an arrangement position of the imaging device 21 in the own vehicle 10 and the angle of view of the imaging device 21. Thus, for example, the plan view as illustrated in FIG. 9 can be generated from the image 46a of the detected vehicle 12. The method of generating the plan view is not limited.

In this embodiment, a tangent line 53 of the white line 50 closest to the detected vehicle 12 is calculated on the basis of the plan view generated from the image 46a of the detected vehicle 12. The posture of the own vehicle 10 with the tangent line 53 being as a reference is calculated. In the example illustrated in FIG. 9, an intersection P' between the white line 50 and a circle 54, which has a distance from the detection position O of the own vehicle 10 to the detected vehicle 12 as a radius, is calculated, and the tangent line 53 of the white line 50 at the intersection P' is calculated. An angle η between a direction of the calculated tangent line 53 and the Y-axis 61b of the own vehicle 10 (front-rear direction of own vehicle 10) is then calculated as the posture information of the own vehicle 10.

Note that, as illustrated in FIG. 9, the position of the intersection P used when the posture information 47 of the detected vehicle 12 is calculated, and the position of the intersection P' used when the posture information of the own vehicle 10 is calculated, may be slightly different from each other. On the other hand, the degree of curvature of the road (such as the radius of curvature of the curve) is assumed to be sufficiently large as compared with, for example, the size of the vehicle and the width of the lane. Thus, the tangent line 52 of the white line 50 at the intersection P and the tangent line 53 of the white line 50 at the intersection P' can be regarded as substantially parallel directions.

Therefore, the posture information of the own vehicle 10 can also be information of the posture of the own vehicle 10 relative to the direction of the tangent line 52 serving as a reference for the posture information 47 of the detected vehicle 12. In other words, the posture information of the own vehicle 10 and the posture information 47 of the detected vehicle 12 are information indicating the postures of the respective vehicles for a common direction. Thus, with the common direction being as a reference, an arrangement relationship between the own vehicle 10 and the detected vehicle 12 or the like can be calculated with high accuracy.

Further, in the own vehicle 10, the image capturing of the image 46a of the detected vehicle 12 described above is continuously executed during the period of time in which the posture information 47 of the detected vehicle 12 is repeatedly calculated. Specifically, the communication control unit 34 controls the imaging device 21 such that the image 46a of the detected vehicle 12 is continuously detected during a period of time in which the posture information 47 (attribute information 45) of the detected vehicle 12 is continuously generated.

The interval (frame rate) or the like for capturing the image 46a of the detected vehicle 12 is not limited. For example, the interval may be appropriately set in accordance with imaging conditions of or the like the imaging device 21. That is, the image 46a of the detected vehicle 12 may be captured at different intervals from the intervals at which the posture information 47 is calculated in the detected vehicle 12.

The period of time in which the detected vehicle 12 is imaged or the like is not limited. For example, when the period of time in which the posture information 47 of the detected vehicle 12 is calculated ends, the imaging of the detected vehicle 12 ends. Further, for example, in a case where there is a response signal or the like notifying that the calculation process of the posture information 47 of the detected vehicle 12 is completed, from the detected vehicle 12, a process such as terminating the imaging of the image 46a of the detected vehicle 12 may be executed.

As described above, in Step 302, a plurality of images 46a of the detected vehicle 12 is successively detected. Further, the posture information of the own vehicle 10 relative to the white line 50 (posture angle η of own vehicle 10) is calculated for each of the plurality of images 46a of the detected vehicle 12. The plurality of images 46a of the detected vehicle 12 corresponding to a predetermined period of time is saved together with the posture information and the GPS time of the own vehicle 10 corresponding to each image 46a (Step 304).

Referring back to FIG. 7, when the calculation process of the posture information 47 of the detected vehicle 12 relative to the white line 50 is completed in the detected vehicle 12, the posture information 47 of the detected vehicle 12 corresponding to a predetermined period of time (see FIG. 10) is transmitted toward the own vehicle 10 (Step 207). Further, the own vehicle 10 determines whether or not the posture information 47 of the detected vehicle 12 relative to the white line 50 has been received (Step 109).

If the posture information 47 of the detected vehicle 12 has not been received (No in Step 109), the next loop process is executed. Further, if the posture information 47 of the detected vehicle 12 has been received (Yes in Step 109), the process of calculating the relative posture of the detected vehicle 12 relative to the own vehicle 10 is executed, and learning data 40 including the relative posture is generated (Step 110, Step 208).

In Step 110, the GPS time given to the image 46a of the detected vehicle 12, and the GPS time given to the posture information 47 of the detected vehicle 12 are compared, and the image 46a and the posture information 47 of the detected vehicle 12 of the same time are selected. Thus, it is possible to select the posture information 47 of the detected vehicle 12 relative to the white line 50 at the timing at which the image 46a of the detected vehicle 12 is captured. As a result, it is possible to calculate the relative posture or the like with high accuracy, and to improve the accuracy of the learning data 40. Note that in the present disclosure, the same time includes substantially the same time.

When the image 46a of the detected vehicle 12 and the posture information 47 of the detected vehicle 12 are selected, label information 42 to be associated with the learning data 40 is generated. In this embodiment, the label information 42 is generated by the generation process unit 33 on the basis of the posture information of the own vehicle 10 and the posture information 47 of the detected vehicle 12. More specifically, the label information 42 including the relative posture of the detected vehicle 12 relative to the own vehicle 10 is generated. Hereinafter, the relative posture calculated as the label information 42 will be described in detail with reference to FIG. 9.

FIG. 9 illustrates an intersection angle ξ between the front-back direction (Y-axis 61a) of the detected vehicle 12 and the front-back direction (Y-axis 61b) of the own vehicle 10. For example, the detected vehicle 12 travels at an angle of the intersection angle ξ relative to the traveling direction of the own vehicle 10. Using the intersection angle ξ, it is possible to quantitatively predict and analyze the traveling direction or the like of the detected vehicle 12, and to achieve various processes used in the vehicle control such as posture recognition and trajectory prediction of the detected vehicle 12.

Further, in FIG. 9, a detected direction 55 of the detected vehicle 12 when viewed from the own vehicle 10 is illustrated by using an arrow. Here, the detected direction 55 is, for example, a direction toward the center of the detected vehicle 12 from the detection point O of the own vehicle 10. In the following description, an angle between the detected direction 55 and the front-back direction (Y-axis 61b) of the own vehicle 10 is referred to as a detection angle θ.

The intersection angle ξ can be calculated using an angle Ψ between the detected direction 55 and the Y-axis 61a of the detected vehicle 12, and the detection angle θ. Hereinafter, the angle Ψ is referred to as a detected posture angle Ψ. As illustrated in FIG. 9, the intersection angle ξ is expressed as follows using the detected posture angle Ψ and the detection angle θ.

$$\xi = \Psi - \theta \quad (1)$$

Note that the detection angle θ of the detected vehicle 12 can be calculated on the basis of, for example, the angle of view of the image 46a of the detected vehicle 12, the location of the target vehicle in the image 46a, and the like.

For example, a detected posture angle Ψ of a target vehicle is extracted from an image of the target vehicle (unknown data) by the process using machine learning, and thus an intersection angle ξ with the target vehicle can be calculated. Thus, a learning device for extracting the detected posture angle Ψ from the unknown data is configured, and thus the detected posture angle Ψ can be extracted regardless of the location or the like of the target vehicle in the unknown data (in the image). As a result, it is possible to properly calculate the intersection angle ξ for any unknown data.

In this embodiment, the detected posture angle Ψ is calculated as the relative posture of the detected vehicle 12 relative to the own vehicle 10. The calculated detected posture angle Ψ is then used as the label information 42.

As illustrated in FIG. 9, the detected posture angle Ψ is expressed as follows using the detection angle θ, the posture angle φ of the detected vehicle 12 relative to the white line 50, and the posture angle η of the own vehicle 10 relative to the white line 50.

$$\Psi = \theta + \xi = \theta + \varphi + \eta \quad (2)$$

The generation process unit 33 calculates the detected posture angle Ψ on the basis of the above equation (2).

The detected posture angle Ψ (label information 42) and the image 46a of the detected vehicle 12 used to calculate the detected posture angle Ψ are associated with each other, and the learning data 40 is generated. At this time, the attribute information regarding other attributes of the detected vehicle 12, such as the vehicle type and the model, may be associated with the learning data 40 (see FIG. 4). Further, for example, learning data or the like in which the depth information obtained by observing the detected vehicle 12, and the detected posture angle Ψ are associated with each other may be appropriately generated. The generated learning data 40 is saved in the database 35 configured in a server or a storage unit.

When the learning data 40 is saved, a signal notifying that the generation process of the learning data 40 has been completed is transmitted from the own vehicle 10 toward the detected vehicle 12 (Step 209). Thus, a communication session between the own vehicle 10 and the detected vehicle 12 is ended, and a loop process for generating the next learning data 40 is started.

As described above, in this embodiment, it is possible to generate the learning data 40 for training the learning device or the like for extracting the detected posture angle Ψ. Further, since the detected posture angle Ψ can be calculated on the basis of the posture information 47 and the like transmitted from the detected vehicle 12, the learning data 40 (label information 42) can be easily generated. As a result, it is possible to easily mass-produce the learning data 40 at a low cost, and it is possible to improve the accuracy of the machine learning available for the control of the vehicle or the like.

Referring back to FIG. 11, if the distance to the detected vehicle 12 is larger than the predetermined threshold value (No in Step 301), it is determined that the distance to the white line 50 closest to the detected vehicle 12 is sufficiently large. In this case, the own vehicle 10 approaches the white line 50 closest to the detected vehicle 12, and the posture information of the own vehicle 10 is calculated by (in Step 302).

Figure 12:
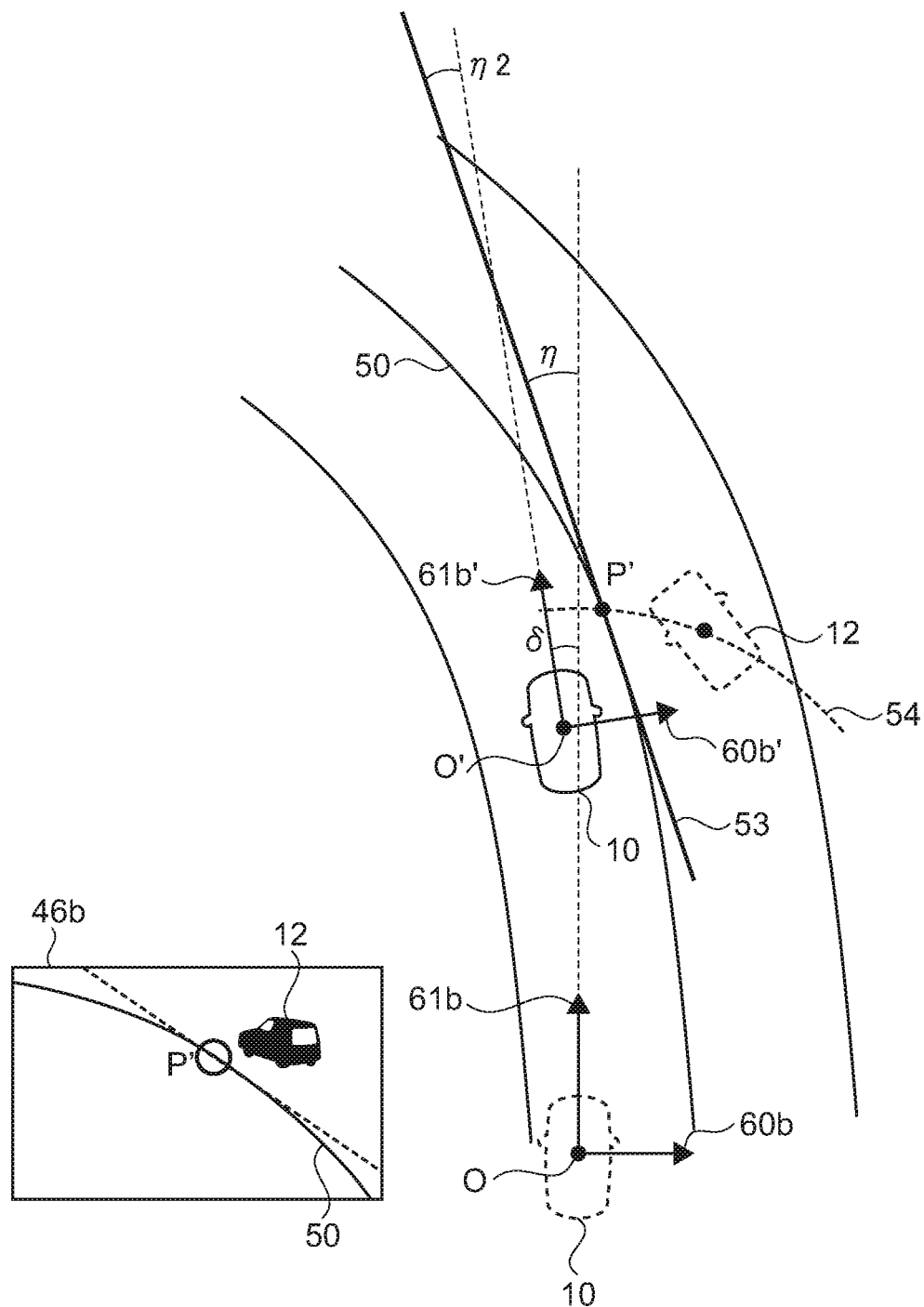
FIG. 12 is a schematic diagram for describing another example of the process of calculating a relative posture.

FIG. 12 is a schematic diagram for describing another example of the process of calculating the relative posture. FIG. 12 schematically illustrates the own vehicle 10 and the detected vehicle 12 by a dotted line, when the distance to the detected vehicle 12 is determined to be larger than the predetermined threshold value.

In Step 302, an image 46b of the detected vehicle 12 is captured. That is, the image 46b of the detected vehicle 12 is captured at a detection point O at which the distance to the detected vehicle 12 is larger than the predetermined threshold value. FIG. 12 schematically illustrates the image 46b of the detected vehicle 12 captured from the detection point O. In the image 46b of the detected vehicle 12 illustrated in FIG. 12, for example, as compared with the image 46a illustrated in FIG. 9, the detected vehicle 12 traveling away from the own vehicle 10 is imaged.

Further, the distance to the detected vehicle 12 is appropriately measured using the distance sensor 22 or the like at a timing at which the image 46b of the detected vehicle 12 is captured. An intersection P' between the white line 50 and the circle 54, which has a distance to the detected vehicle 12 as a radius, is then calculated. The image 46b of the detected vehicle 12 is saved together with the position of the intersection P', and the GPS time at the timing at which the image 46b is captured.

The own vehicle 10 continues to travel, and when the own vehicle 10 reaches a proximity position O' close to the intersection P', the imaging device 21 captures an image (proximity image) of the front side of the own vehicle 10. FIG. 9 schematically illustrates the own vehicle 10 moved to the proximity position O' by a solid line. Note that, while the own vehicle 10 is moved to the proximity position O', the detected vehicle 12 is also moved. The detected vehicle 12 does not appear in the proximity image captured at the proximity position O' in some cases.

The proximity image is captured so as to include, for example, the intersection P'. Therefore, the proximity position O' is a position where the intersection P' can be imaged. For example, the proximity position O' is appropriately set such that the relative posture can be properly calculated. The method of setting the proximity position O' or the like is not limited. For example, any position at which the intersection P' can be imaged and at which the distance to the intersection P' is shorter than the predetermined threshold value may be set as the proximity position O'.

Thus, in this embodiment, if the distance between the detection position O, at which the image 46b of the detected vehicle 12 is detected, and the white line 50 is larger than the predetermined threshold value, the proximity image detected at the proximity position O' closer to the white line 50 than the detection position O is acquired. In this embodiment, the proximity image corresponds to reference peripheral information.

In this embodiment, the relative posture at the detection position O is calculated on the basis of the proximity image. That is, using the proximity image, the detected posture angle Ψ of the detected vehicle 12 detected by the own vehicle 10 from the detection position O is calculated.

First, the self-location estimation unit 132 calculates proximity posture information regarding the posture of the own vehicle 10 relative to the white line 50 at the proximity position O' on the basis of the proximity image. For example, a plan view of a road, on which the own vehicle 10 travels, viewed from above is generated on the basis of the proximity image. The tangent line 53 of the white line 50 at the intersection P' is then calculated on the basis of the plan view. FIG. 12 illustrates the tangent line 53 of the white line 50 at the intersection P' calculated on the basis of the proximity image.

An angle η2 between the direction of the tangent line 53 of the white line 50 calculated from the proximity image and the front-back direction (Y-axis 61b') of the own vehicle 10 at the proximity position O' is calculated as the proximity posture information of the own vehicle 10. In this embodiment, the proximity posture information corresponds to reference posture information.

Further, the self-location estimation unit 132 calculates a posture change δ of the own vehicle 10 while moving from the detection position O to the proximity position O'. The method of calculating the posture change δ or the like is not limited. For example, odometry using a change in the image detected by the imaging device 21 (Visual Odometry), odometry using a wheel encoder or the like (WheelOdometry), inertial navigation using the inertial measurement unit (IMU) or the like, and the like may be appropriately used.

As illustrated in FIG. 12, the posture change δ is an angle between the front-back direction (Y-axis 61b) of the own vehicle 10 at the detection position O and the front-rear direction (Y-axis 61b') of the own vehicle 10 at the proximity position O'. Therefore, the angle η between the direction of the tangent line 53 of the white line 50 and the front-back direction (Y-axis 61b) of the own vehicle 10 at the detection position O is expressed as follows using the posture angle η2 of the own vehicle 10 relative to the tangent line 53 of the white line 50 at the approaching position O, and the posture change δ.

$$\eta = \delta + \eta 2 \qquad (3)$$

The self-location estimation unit 132 calculates the posture angle η of the own vehicle 10 relative to the tangent line 53 of the white line 50 at the detection position O on the basis of the equation (3). As described above, in this embodiment, the posture information of the own vehicle 10 relative to the white line 50 closest to the detected vehicle 12 at the detection position O is calculated on the basis of the proximity posture information (posture angle η2) and the posture change δ. That is, it can also be said that the proximity posture information is converted into posture information of the own vehicle 10 at the time when the intersection P' is stored.

For example, in a case where the detection position O and the detected vehicle 12 are distant from each other, for example, when the tangent line 53 to the white line 50 in the vicinity of the detected vehicle 12 is calculated from the image 46b of the detected vehicle 12 captured at the detection position O, errors or the like may occur. In this embodiment, the position of the white line 50 (intersection P') in the vicinity of the detected vehicle 12 is recorded, and the posture information of the own vehicle 10 is calculated on the basis of the proximity image captured close to the recorded position. Thus, even if the distance from the detected vehicle 12 is large, the posture angle η of the own vehicle 10 relative to the white line 50 can be calculated with high accuracy.

Note that, in Step 302, during the period of time in which the posture information 47 of the detected vehicle 12 is continuously calculated, the plurality of images 46b of the detected vehicle 12 is continuously captured. The process of calculating the proximity posture information based on the proximity image described above, or the like is appropriately executed for each of the plurality of images 46b of the detected vehicle 12. Therefore, even if the detected vehicle 12 is farther than a predetermined threshold value, the plurality of images 46b of the detected vehicle 12 and the posture angle η of the own vehicle 10 corresponding to each image 46b can be properly calculated.

The relative posture (detected posture angle Ψ) in the image 46b of the detected vehicle 12 is calculated on the basis of the calculated posture angle η of the own vehicle 10 and the posture angle φ of the detected vehicle 12 transmitted from the detected vehicle 12, and the learning data 40 is generated (Step 110, Step 208). Thus, it is possible to generate the learning data 40 including the image 46b captured away from the detected vehicle 12. As a result, it is possible to increase the variation of the learning data 40 and it is possible to significantly improve the accuracy of the machine learning available for vehicle control or the like.

As described above, in the autonomous driving control unit 112 according to this embodiment, the peripheral information 41 of the own vehicle 10 is acquired, and the attribute information 45 of the detected vehicle 12 in the vicinity of the own vehicle 10 is acquired from an apparatus different from the own vehicle 10. The learning data 40 for extracting the attributes of the target vehicle is generated from the acquired peripheral information 41 and attribute information 45. In such a manner, it becomes possible to easily generate the learning data 40 by acquiring the attribute information of the detected vehicle 12 from another apparatus, and to improve the accuracy of the machine learning available for the control of the target vehicle or the like.

As a method of generating a labeled image, a method of manually labeling an image by an operator is conceivable. For example, a learning operation of a learning device using machine learning may need a large number of labeled images. Thus, manual labeling can take time to prepare a large number of labeled images. Further, the cost of generating learning data may increase.

In this embodiment, the attribute information 45 of the detected vehicle 12 itself is acquired from the detected vehicle 12 by using V2V communication. Therefore, the attributes of the detected vehicle 12 (posture, vehicle type, and the like) can be automatically collected together with the image obtained by imaging the detected vehicle 12. This makes it possible to easily generate the label information 42 to be associated with the peripheral information 41 such as an image of the detected vehicle 12, for example. As a result, it is possible to easily generate the learning data 40 for training the learning device for extracting the attribute information of the target vehicle to be processed in the machine learning.

Further, the learning data 40 can be automatically generated without the manual operation during the operation of the own vehicle 10. Therefore, a large amount of learning data 40 necessary for machine learning such as deep learning can be prepared in a short period of time and at low costs. As a result, it becomes possible to sufficiently train a learning device having the function of machine learning, and it is possible to sufficiently improve the accuracy of machine learning available for vehicle control such as autonomous driving.

For example, in a case of CG data or the like, it is possible to easily generate the learning data. However, in the process of machine learning used in autonomous driving or the like, an actual image or the like actually captured becomes input data. In this embodiment, it is possible to generate the learning data 40 on the basis of peripheral information (such as an image of the detected vehicle 12) detected in an actual driving environment. Therefore, it is possible to generate various types of learning data 40 for training machine learning used in autonomous driving or the like, and it is possible to sufficiently improve the accuracy of the learning device.

Further, as the label information 42 associated with the learning data 40, various types of attribute information 45 such as the posture and the vehicle type of the detected vehicle 12 can be used. Thus, for example, the learning data 40 having high versatility can be easily generated. Further, for example, it is possible to accumulate the learning data 40 according to the purpose of the learning device, and it is possible to efficiently achieve learning operations of various learning devices.

Further, in this embodiment, the posture information 47 of the detected vehicle 12 relative to the white line 50 is collected and the posture of the own vehicle 10 relative to the white line 50 is taken into consideration, and thus the relative posture (detected posture angle $\Psi$) of the detected vehicle 12 relative to the own vehicle 10 can be acquired. As a result, even if an absolute posture of the detected vehicle 12 is unknown, it is possible to properly generate the learning data 40 labeled with attributes such as the posture of the detected vehicle 12.

OTHER EMBODIMENTS

The present technology is not limited to the embodiment described above and can achieve other various embodiments.

In the above embodiment, the posture information of the own vehicle 10 and the posture information of the detected vehicle 12 are calculated with a predetermined object, i.e., the white line 50 on the road being as a reference. The predetermined object is not limited to the white line (lane boundary line) on the road.

For example, a road sign or the like may be used as the predetermined object. For example, a road sign or the like that is in the vicinity of the detected vehicle and is detected by the imaging device may be specified by the transmission request signal or the like in Step 203. In this case, for example, the normal direction or the like of the road sign is set as a reference direction, and the posture information of each of the own vehicle and the detected vehicle is calculated.

Further, for example, a reflector or the like installed on a road shoulder or the like of a road may be set as the predetermined object. For example, two reflectors installed in the vicinity of the detected vehicle are specified, and the posture information of each of the own vehicle and the detected vehicle is calculated with a direction connecting the specified reflectors being as a reference direction. Such a process may be performed.

In addition, the method of setting the predetermined object or the like is not limited. For example, any object, structure, paint, or the like capable of setting a reference direction serving as a reference for the posture of each of the own vehicle 10 and the detected vehicle 12 may be set as the predetermined object.

Further, as the posture information of the own vehicle and the detected vehicle, the posture value or the like of each vehicle on the map may be used. That is, the absolute value of the posture of each vehicle on the map may be used. In this case, for example, the intersection angle $\xi$ is calculated on the basis of the absolute values of the postures of the own vehicle and the detected vehicle on the map at the same time. The detected posture angle $\Psi$ can be appropriately calculated on the basis of the intersection angle $\xi$. This eliminates the need for the process of calculating the posture information with an object such as a white line being a reference, and makes it possible to easily calculate the detected posture angle $\Psi$.

In the above description, the learning data 40 using still images is generated. The present technology is not limited to this, and the learning data 40 using a moving image (video) may be generated. For example, for images (video) of the detected vehicle continuously captured, the detected posture angle $\Psi$ or the like in each frame is calculated. Thus, it is possible to calculate a temporal change of the posture of the detected vehicle. The learning data in which the temporal change of the posture is associated with the video obtained by imaging the detected vehicle may be generated. Thus, for example, it is possible to train a learning device for extracting a posture change or the like of a target vehicle from a moving image.

In the above embodiment, the attribute information of the detected vehicle 12 is transmitted from the detected vehicle 12. The present technology is not limited to this, and the attribute information of the detected vehicle 12 may be transmitted from an apparatus other than the detected vehicle 12.

For example, a generation apparatus for generating the posture information of the detected vehicle is installed in the tollgate or the like of a toll road. For example, in the tollgate, a vehicle is guided along a predetermined lane. The generation apparatus generates, as posture information, information on the posture (traveling direction or the like) of the vehicle guided along the lane. The own vehicle detects, for example, a vehicle traveling along the lane, and requests the generation apparatus to transmit the posture information of the vehicle by using road-to-vehicle communication or the like. Such a process may be performed.

Further, the attribute information such as the posture of the traveling vehicle may be generated by a monitoring camera or the like installed on the road shoulder and acquired by the own vehicle. In addition, an apparatus for generating the attribute information of the detected vehicle is not limited, and for example, any apparatus capable of generating attribute information of a detected vehicle specified by the own vehicle may be used. Thus, a large amount of learning data can be easily generated, and the accuracy of machine learning used for vehicle control or the like can be sufficiently improved.

Further, a computer (autonomous driving control unit) installed in the own vehicle and another computer (cloud server) communicable via a network or the like may work in conjunction with each other to execute the information processing method and the program according to the present technology and establish the information processing apparatus according to the present technology.

In other words, the information processing method and the program according to the present technology may be executed not only in a computer system configured by a single computer but also in a computer system in which a plurality of computers operates in conjunction with each other. Note that, in the present disclosure, the system means an aggregate of a plurality of components (such as apparatuses or modules (parts)) and it does not matter whether or not all the components are housed in the identical casing. Therefore, a plurality of apparatuses housed in separate casings and connected to one another via a network, and a single apparatus having a plurality of modules housed in a single casing are both the system.

The execution of the information processing method and the program according to the present technology by the computer system includes, for example, both of the case where the acquisition of the peripheral information of the own vehicle, the acquisition of the attribute information of the detected vehicle, the generation of the learning data, and the like are executed by a single computer and the case where those processes are executed by different computers. Further, the execution of the respective processes by a predetermined computer includes causing another computer to execute some or all of those processes and acquiring results thereof.

In other words, the information processing method and the program according to the present technology are also applicable to a cloud computing configuration in which one function is shared and cooperatively processed by a plurality of apparatuses via a network.

Besides, the technology according to the present disclosure can be applied to various products. For example, the technology according to the present disclosure may be achieved as an apparatus installed in any kind of mobile object such as vehicles, electric vehicles, hybrid electric vehicles, motorcycles, bicycles, personal transporters, airplanes, drones, ships, robots, construction machinery, agricultural machinery (tractors), and the like.

Out of the feature parts according to the present technology described above, at least two feature parts can be combined. That is, the various feature parts described in the respective embodiments may be arbitrarily combined irrespective of the embodiments. Further, various effects described above are merely examples and are not limited, and other effects may be exerted.

Note that the present technology may also be configured as below.

(1) An information processing apparatus, including:
a first acquisition unit that acquires peripheral information regarding a periphery of a first mobile object;
a second acquisition unit that acquires, from an apparatus different from the first mobile object, attribute information regarding an attribute of a second mobile object present in the periphery of the first mobile object; and
a generation unit that generates learning data for extracting an attribute of a target mobile object, on the basis of the acquired peripheral information and the acquired attribute information.

(2) The information processing apparatus according to (1), in which
the learning data is data in which the peripheral information and label information are associated with each other, and
the generation unit generates the label information associated with the peripheral information on the basis of the attribute information of the second mobile object.

(3) The information processing apparatus according to (1) or (2), in which
the attribute information includes at least one of a posture, a location, a vehicle type, or a model of the second mobile object.

(4) The information processing apparatus according to any one of (1) to (3), in which
the apparatus different from the first mobile object is the second mobile object.

(5) The information processing apparatus according to any one of (1) to (4), in which
the first mobile object includes a sensor unit that detects at least one of image information or depth information of the periphery of the first mobile object, as the peripheral information.

(6) The information processing apparatus according to any one of (1) to (5), further including
a detection unit that detects the second mobile object present in the periphery of the first mobile object, in which
the second acquisition unit is capable of acquiring the attribute information of the detected second mobile object.

(7) The information processing apparatus according to any one of (2) to (6), further including
a calculation unit that calculates first posture information regarding a posture of the first mobile object, in which
the attribute information includes second posture information regarding a posture of the second mobile object, and
the generation unit generates the label information on the basis of the first posture information and the second posture information.

(8) The information processing apparatus according to (7), in which
the calculation unit calculates the first posture information on the basis of the peripheral information.

(9) The information processing apparatus according to (7) or (8), in which
the generation unit calculates, as the label information, a relative posture of the second mobile object relative to the first mobile object on the basis of the first posture information and the second posture information.

(10) The information processing apparatus according to (9), in which
the peripheral information includes information of a reference object that is a reference for calculating the relative posture,
the first posture information is information of a posture of the first mobile object relative to the reference object, and
the second posture information is information of a posture of the second mobile object relative to the reference object.

(11) The information processing apparatus according to (10), in which
the first posture information is information of a posture of the first mobile object relative to a reference direction with the reference object being as a reference, and
the second posture information is information of a posture of the second mobile object relative to the reference direction.

(12) The information processing apparatus according to (10) or (11), in which
the first acquisition unit acquires, if a distance between a detection position at which the peripheral information is detected and the reference object is larger than a predetermined threshold value, reference peripheral information detected at a proximity position closer to the reference object than the detection position, and the generation unit calculates the relative posture at the detection position on the basis of the reference peripheral information.

(13) The information processing apparatus according to (12), in which the calculation unit calculates reference posture information regarding a posture of the first mobile object relative to the reference object at the proximity position on the basis of the reference peripheral information, and calculates a posture change of the first mobile object during movement from the detection position to the proximity position.

(14) The information processing apparatus according to (13), in which the calculation unit calculates the first posture information regarding a posture of the first mobile object relative to the reference object at the detection position on the basis of the reference posture information and the posture change.

(15) The information processing apparatus according to any one of (1) to (14), in which the second acquisition unit acquires information regarding a timing at which the attribute information is generated.

(16) The information processing apparatus according to any one of (1) to (15), further including a timing control unit that controls a timing at which the peripheral information is detected, in accordance with a timing at which the attribute information is generated.

(17) The information processing apparatus according to (16), in which the apparatus different from the first mobile object is capable of continuously generating the attribute information, and the timing control unit controls a sensor unit that detects the peripheral information such that the peripheral information is continuously detected during a period of time in which the attribute information is continuously generated.

(18) An information processing method to be executed by a computer system, the information processing method including:

acquiring peripheral information regarding a periphery of a first mobile object;

acquiring, from an apparatus different from the first mobile object, attribute information regarding an attribute of a second mobile object present in the periphery of the first mobile object; and generating learning data for extracting an attribute of a target mobile object, on the basis of the acquired peripheral information and the acquired attribute information.

(19) A program that causes a computer system to execute the steps of:

acquiring peripheral information regarding a periphery of a first mobile object;

acquiring, from an apparatus different from the first mobile object, attribute information regarding an attribute of a second mobile object present in the periphery of the first mobile object; and generating learning data for extracting an attribute of a target mobile object, on the basis of the acquired peripheral information and the acquired attribute information.

(20) A mobile object, including:

a first acquisition unit that acquires peripheral information regarding a periphery;

a second acquisition unit that acquires, from a different apparatus, attribute information regarding an attribute of a peripheral mobile object present in the periphery; and a generation unit that generates learning data for extracting an attribute of a target mobile object, on the basis of the acquired peripheral information and the acquired attribute information.

REFERENCE SIGNS LIST

10 own vehicle
11 peripheral vehicle
20 peripheral sensor
30 peripheral information acquisition unit
31 detection process unit
32 attribute information acquisition unit
33 generation process unit
34 communication control unit
40 learning data
41 peripheral information
42 label information
45 attribute information
47 posture information of detected vehicle
51 predetermined object
112 autonomous driving control unit
132 self-location estimation unit
141 vehicle exterior information detection unit

The invention claimed is:

1. An information processing apparatus, comprising:
at least one sensor configured to acquire peripheral information regarding a periphery of a first mobile object; and
at least one processor configured to:
calculate first posture information regarding a posture of the first mobile object;
acquire, from an apparatus different from the first mobile object, attribute information regarding an attribute of a second mobile object that is in the periphery of the first mobile object, wherein the attribute information includes second posture information regarding a posture of the second mobile object;
generate label information based on the first posture information and the second posture information; and
generate learning data based on the acquired peripheral information and the acquired attribute information, wherein
the learning data includes association of the acquired peripheral information and the generated label information, and
the learning data is generated for extraction of an attribute of a target mobile object.

2. The information processing apparatus according to claim 1, wherein the attribute information includes information associated with at least one of a location, a vehicle type, or a model of the second mobile object.

3. The information processing apparatus according to claim 1, wherein the apparatus different from the first mobile object is the second mobile object.

4. The information processing apparatus according to claim 1, wherein the at least one sensor is further configured to detect at least one of image information or depth information of the periphery of the first mobile object, as the peripheral information.

5. The information processing apparatus according to claim 1, the at least one processor is further configured to:
   detect the second mobile object in the periphery of the first mobile object; and
   acquire the attribute information of the second mobile object based on the detection of the second mobile object.

6. The information processing apparatus according to claim 1, wherein the at least one processor is further configured to calculate the first posture information based on the peripheral information.

7. The information processing apparatus according to claim 1, wherein the at least one processor is further configured to calculate, as the label information, a relative posture of the second mobile object relative to the first mobile object based on the first posture information and the second posture information.

8. The information processing apparatus according to claim 7, wherein
   the peripheral information includes information of a reference object that is a reference for the calculation of the relative posture,
   the first posture information is information of the posture of the first mobile object relative to the reference object, and
   the second posture information is information of the posture of the second mobile object relative to the reference object.

9. The information processing apparatus according to claim 8, wherein
   the first posture information is information of the posture of the first mobile object relative to a reference direction associated with the reference object, and
   the second posture information is information of the posture of the second mobile object relative to the reference direction.

10. The information processing apparatus according to claim 8, wherein the at least one processor is further configured to:
    acquire, when a distance between a detection position of a detection of the peripheral information is detected and the reference object is larger than a threshold value, reference peripheral information, wherein the reference peripheral information is detected at a proximity position closer to the reference object than the detection position; and
    calculate the relative posture at the detection position based on a basis of the reference peripheral information.

11. The information processing apparatus according to claim 10, wherein the at least one processor is further configured to:
    calculate reference posture information regarding the posture of the first mobile object relative to the reference object at the proximity position based on the reference peripheral information; and
    calculate a posture change of the first mobile object during movement from the detection position to the proximity position.

12. The information processing apparatus according to claim 11, wherein the at least one processor is further configured to calculate the first posture information regarding the posture of the first mobile object relative to the reference object at the detection position based on a basis of the reference posture information and the posture change.

13. The information processing apparatus according to claim 2, wherein the at least one processor is further configured to acquire information regarding a timing of generation of the attribute information.

14. The information processing apparatus according to claim 1, wherein the at least one processor is further configured to control a timing of detection of the peripheral information based on a timing of generation of the attribute information.

15. The information processing apparatus according to claim 14, wherein
    the apparatus different from the first mobile object continuously generates the attribute information, and
    the at least one processor is further configured to control detection of the peripheral information such that the peripheral information is continuously detected during a period of the continuous generation of the attribute information.

16. An information processing method to be executed by a computer system, the information processing method comprising:
    acquiring peripheral information regarding a periphery of a first mobile object;
    calculating first posture information regarding a posture of the first mobile object;
    acquiring, from an apparatus different from the first mobile object, attribute information regarding an attribute of a second mobile object that is in the periphery of the first mobile object, wherein the attribute information includes second posture information regarding a posture of the second mobile object;
    generating label information based on the first posture information and the second posture information; and
    generating learning data based on the acquired peripheral information and the acquired attribute information, wherein
    the learning data includes association of the acquired peripheral information and the generated label information, and
    the learning data is generated for extraction of an attribute of a target mobile object.

17. A non-transitory computer-readable medium having stored thereon computer-executable instructions, which when executed by a computer, cause the computer to execute operations, the operations comprising:
    acquiring peripheral information regarding a periphery of a first mobile object;
    calculating first posture information regarding a posture of the first mobile object;
    acquiring, from an apparatus different from the first mobile object, attribute information regarding an attribute of a second mobile object that is in the periphery of the first mobile object, wherein the attribute information includes second posture information regarding a posture of the second mobile object;
    generating label information based on the first posture information and the second posture information; and
    generating learning data based on the acquired peripheral information and the acquired attribute information, wherein
    the learning data includes association of the acquired peripheral information and the generated label information, and
    the learning data is generated for extraction of an attribute of a target mobile object.

18. A mobile object, comprising:
    at least one sensor configured to acquire peripheral information regarding a periphery of the mobile object; and at least one processor configured to:
  calculate first posture information regarding a posture of the mobile object;
  acquire, from a different apparatus, attribute information regarding an attribute of a peripheral mobile object that is in the periphery of the mobile object, wherein the attribute information includes second posture information regarding a posture of the peripheral mobile object;
  generate label information based on the first posture information and the second posture information; and
  generate learning data based on the acquired peripheral information and the acquired attribute information, wherein
    the learning data includes association of the acquired peripheral information and the generated label information, and
    the learning data is generated for extraction of an attribute of a target mobile object.

* * * * *